(12) United States Patent
Bae

(10) Patent No.: US 12,111,458 B2
(45) Date of Patent: Oct. 8, 2024

(54) ELECTRO-RESPONSIVE GEL LENS HAVING AUTOMATIC MULTIFOCAL AND IMAGE STABILIZATION FUNCTIONS

(71) Applicant: KOREA UNIVERSITY OF TECHNOLOGY AND EDUCATION INDUSTRY-UNIVERSITY COOPERATION FOUNDATION, Cheonan-si (KR)

(72) Inventor: Jin Woo Bae, Gyeonggi-do (KR)

(73) Assignee: KOREA UNIVERSITY OF TECHNOLOGY AND EDUCATION INDUSTRY-UNIVERSITY COOPERATION FOUNDATION, Cheonan-si (KR)

(*) Notice: Subject to any disclaimer, the term of this patent is extended or adjusted under 35 U.S.C. 154(b) by 242 days.

(21) Appl. No.: 17/784,669

(22) PCT Filed: Mar. 25, 2020

(86) PCT No.: PCT/KR2020/004022
§ 371 (c)(1),
(2) Date: Jun. 13, 2022

(87) PCT Pub. No.: WO2021/125451
PCT Pub. Date: Jun. 24, 2021

(65) Prior Publication Data
US 2023/0026612 A1  Jan. 26, 2023

(30) Foreign Application Priority Data

Dec. 17, 2019 (KR) .................. 10-2019-0168786
Dec. 17, 2019 (KR) .................. 10-2019-0168787
(Continued)

(51) Int. Cl.
*G02B 26/00* (2006.01)
*G02B 3/14* (2006.01)
(Continued)

(52) U.S. Cl.
CPC ............. *G02B 26/004* (2013.01); *G02B 3/14* (2013.01); *G02B 15/04* (2013.01); *G02B 26/0875* (2013.01); *G02B 27/646* (2013.01)

(58) Field of Classification Search
CPC . G02B 26/004; G02B 26/005; G02B 26/0875
See application file for complete search history.

(56) References Cited

U.S. PATENT DOCUMENTS

2007/0121213 A1   5/2007   Tseng et al.
2007/0141738 A1   6/2007   Weekamp et al.
(Continued)

FOREIGN PATENT DOCUMENTS

KR   10-2008-0030107 A   4/2008
KR      10-0979253 B1    8/2010
(Continued)

OTHER PUBLICATIONS

International Search Report of PCT/KR2020/004022 mailed Sep. 11, 2020.

*Primary Examiner* — Joseph P Martinez
(74) *Attorney, Agent, or Firm* — Revolution IP, PLLC

(57) ABSTRACT

An electro-responsive gel lens having automatic multifocal and image stabilization functions according to the present invention comprises: a first electrode and a second electrode formed on a substrate and having different polarities; and a transmissive part which is formed of an electroactive polymer, and the shape of which is deformed when a voltage is applied to the first electrode and the second electrode, wherein at least one of the first electrode and the second electrode is formed in the plural, and a voltage is individu-
(Continued)

ally applied so as to change the shape of the transmissive part in three dimensions, such that the location of the focal point of light passing through the transmissive part is changed in three dimensions.

16 Claims, 32 Drawing Sheets

(30)    Foreign Application Priority Data

Dec. 17, 2019  (KR) ........................ 10-2019-0168788
Dec. 17, 2019  (KR) ........................ 10-2019-0168789

(51) Int. Cl.
   *G02B 15/04*      (2006.01)
   *G02B 26/08*      (2006.01)
   *G02B 27/64*      (2006.01)

(56)        References Cited

U.S. PATENT DOCUMENTS

2015/0062719 A1\*  3/2015  Kyung .................... G02B 3/14
                                                   359/694
2015/0116815 A1    4/2015  Park et al.

FOREIGN PATENT DOCUMENTS

| KR | 10-2015-0027860 A | 3/2015 |
| KR | 10-2015-0050640 A | 5/2015 |
| KR | 10-2018-0059010 A | 6/2018 |
| KR | 10-1880110 B1    | 7/2018 |
| KR | 10-2018-0114382 A | 10/2018 |

\* cited by examiner

ELECTRO-RESPONSIVE GEL LENS HAVING AUTOMATIC MULTIFOCAL AND IMAGE STABILIZATION FUNCTIONS

CROSS REFERENCE TO PRIOR APPLICATIONS

This application is a National Stage Application of PCT International Patent Application No. PCT/KR2020/004022 filed on Mar. 25, 2020, under 35 U.S.C. § 371, which claims priority to Korean Patent Application Nos. 10-2019-0168786 filed on Dec. 17, 2019, 10-2019-0168787 filed on Dec. 17, 2019, 10-2019-0168788 filed on Dec. 17, 2019 and 10-2019-0168789 filed on Dec. 17, 2019, respectively, which are all hereby incorporated by reference in their entirety.

TECHNICAL FIELD

The present invention relates to a gel lens having a variable curvature based on an electrical signal, and more particularly, to an electro-responsive gel lens having automatic multifocal and image stabilization functions.

BACKGROUND ART

In general, a lens may be used in various electronic devices such as a camera and allow at least one optical wavelength to be focused. In recent years, a variable lens that is used in miniaturized and multifunctional electronic devices has been developed.

To this end, various methods including a method of controlling a shape of a lens by using hydraulic pressure so as to variably control the shape of the lens and adjust a focal point of an image instead of varying a location of the lens, a method of controlling a shape of liquid crystal as a voltage is applied, and a method of controlling a liquid lens capable of adjusting a focal point distance in an optical axis direction by using an electrowetting phenomenon have been researched.

Here, the liquid lens using the electrowetting phenomenon may perform only auto focus (hereinafter, referred to as AF) in the optical axis direction, but may not perform optical image stabilization (hereinafter, referred to as OIS) because a focal point is not moved in a vertical direction of the optical axis direction.

Also, the above-described methods hardly perform miniaturization because additional portions for shape control exist.

DISCLOSURE OF THE INVENTION

Technical Problem

The present invention provides an electro-responsive gel lens having automatic multifocal and image stabilization functions, in which a location of a focal point of light passing through a transmissive part is changed in three dimensions by deforming a shape of the transmissive part in three dimensions according to a voltage applied to the transmissive part formed on an electro-active polymer in order to resolve the above-described limitations of the typical technologies.

The present invention also provides an electro-responsive gel lens having automatic multifocal and image stabilization functions, in which a location of a focal point of light passing through a transmissive part is changed in three dimensions by providing a light collecting member having a shape of a fresnel lens, which is formed of an electro-active polymer and has a variable shape, to deform a shape of the transmissive part in three dimensions according to a voltage applied to the transmissive part.

The object of the present invention is not limited to the aforesaid, but other objects not described herein will be clearly understood by those skilled in the art from descriptions below.

Technical Solution

In order to achieve the objects, an electro-responsive gel lens having automatic multifocal and image stabilization functions includes: a first electrode and a second electrode, which are formed on a substrate and have different polarities; and a transmissive part formed of an electro-active polymer and having a shape deformed when a voltage is applied to the first electrode and the second electrode.

Here, as at least one of the first electrode and the second electrode is provided in plurality, and a voltage is individually applied to change the shape of the transmissive part in three dimensions, a location of a focal point of light passing through the transmissive part is changed in three dimensions.

Also, one of the first electrode and the second electrode, which is provided in plurality, may include a plurality of unit electrodes to which a voltage is individually applied on the substrate, and the electro-responsive gel lens may further include a distortion prevention part configured to block electrical interference between the plurality of unit electrodes and prevent shape distortion of the transmissive part.

Here, the distortion prevention part may be formed on the substrate so that the plurality of unit electrodes are spaced a preset distance from each other.

Here, the preset distance may be in a range from 50 μm to 1000 μm.

Also, the transmissive part may be disposed to expose a partial surface through a through-hole defined in the substrate, and one of the first electrode and the second electrode may be provided in plurality and arranged on the substrate along an inner circumferential surface of the through-hole.

The other of the first electrode and the second electrode, which is not provided in plurality, may be spaced a preset distance from the inner circumferential surface of the through-hole and disposed below the substrate in the form of surrounding the through-hole.

The present distance that is a distance between the first electrode and the second electrode may be set in correspondence to a voltage in a preset range, which is applied from the first electrode and the second electrode to the transmissive part.

Here, the distortion prevention part may be formed between the plurality of unit electrodes so that the plurality of unit electrodes are spaced a preset distance from each other.

Here, the preset distance that is a distance between the plurality of unit electrodes may be changed according to a diameter of the through-hole.

Also, the transmissive part may be disposed on the substrate so that a partial surface protrudes when a voltage is applied, and all of the first electrode and the second electrode may include a plurality of unit electrodes between the substrate and the transmissive part. Here, the first electrode may correspond to a partial surface of the transmissive part, and the second electrode may be formed on the same plane as the first electrode and spaced a preset distance from a circumference of the first electrode to surround a portion of the circumference of the first electrode.

Here, the preset distance that is a distance between the first electrode and the second electrode may prevent short circuit between the first electrode and the second electrode.

Here, the present distance that is the distance between the first electrode and the second electrode may be set in correspondence to a voltage in a preset range, which is applied from the first electrode and the second electrode to the transmissive part.

Also, the distortion prevention part may be formed between the plurality of unit electrodes so that the plurality of unit electrodes are spaced a preset distance from each other.

Here, the preset distance that is a distance between the plurality of unit electrodes may be changed according to a diameter of the protruding partial surface.

Also, the transmissive part may include a light collecting member having a concave-convex shape of which a cross-section has an inclined surface to diffract incident light through the inclined surface, and an inclination angle of the inclined surface may be changed when a voltage is applied to the first electrode and the second electrode.

Here, the light collecting member may include a unit lens having a ring shape in which concave-convex portions each having a cross-section having an inclined surface are arranged consecutively in a circumferential direction thereof A plurality of unit lenses may have the same central axis on the same plane and arranged consecutively in a radial direction from the central axis.

Also, a length of the unit lens from the central axis to the inclined surface may have a preset ratio.

Advantageous Effects

The present invention may perform the optical image stabilization in addition to the auto focus in the optical axis direction as the location of the focal point of the light passing through the transmissive part is changed in three dimensions by deforming the shape of the transmissive part in three dimensions according to the applied voltage.

Also, the present invention has the fresnel gel lens configuration that performs the optical image stabilization in addition to the auto focus in the optical axis direction as the location of the focal point of the light passing through the transmissive part is changed in three dimensions. Thus, the electronic device including the electro-responsive gel lens having the automatic multifocal and image stabilization functions may be miniaturized.

The object of the present invention is not limited to the aforesaid, but other objects not described herein will be clearly understood by those skilled in the art from descriptions below.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

MODE FOR CARRYING OUT THE INVENTION

Figure 1:
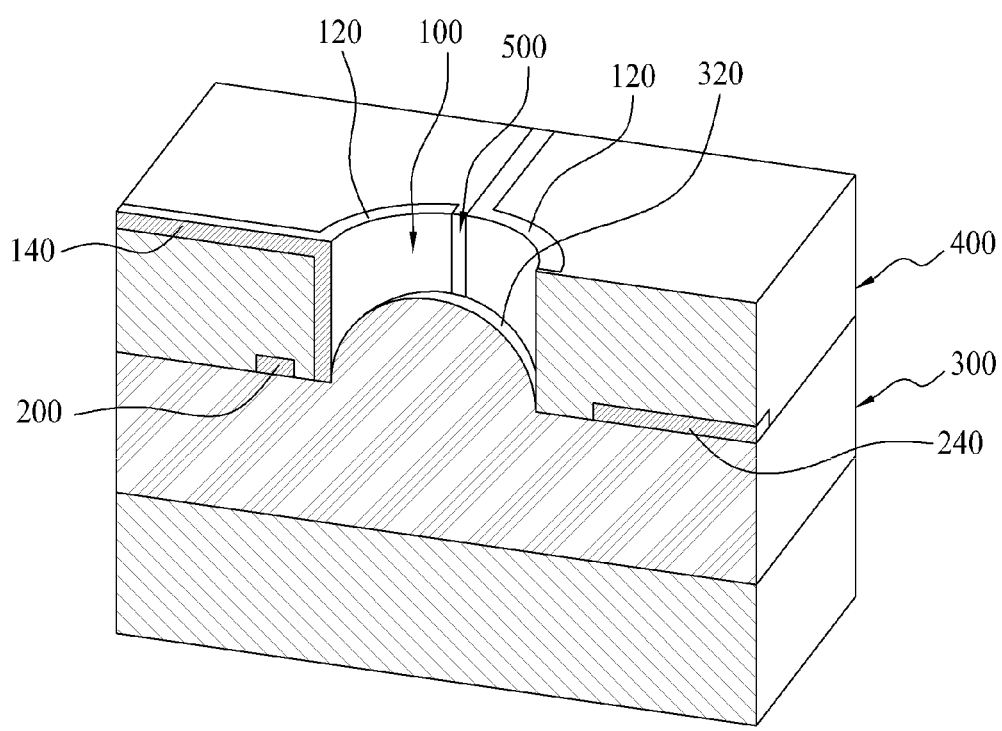
FIG. 1 is a schematic cross-sectional view illustrating an electro-responsive gel lens having automatic multifocal and image stabilization functions according to a first embodiment of the present invention.

Hereinafter, preferred embodiments of the present invention for implementing purposes of the present invention will be described with reference to the accompanying drawings. Like reference numerals in the drawings denote like elements, and thus their description will be omitted.

The present invention relates to an electro-responsive gel lens having automatic multifocal and image stabilization functions and will be described in detail with reference to the accompanying drawings.

An electro-responsive gel lens 10 having automatic multifocal and image stabilization functions according to a first embodiment of the present invention may include a first electrode 100, a second electrode 200, and a transmissive part 300.

The first electrode 100 may be formed on a substrate 400 and have a polarity different from that of the second electrode 200, and a voltage may be applied from an external power to the first electrode 100.

Here, at least one of the first electrode 100 and the second electrode 200 may be formed in plurality, and a voltage may be individually applied. Hereinafter, a case when only the first electrode 100 is formed in plurality will be firstly described through the first embodiment.

Specifically, the first electrode 100 may include a plurality of unit electrodes 120 each having a positive (+) polarity and be formed along an inner circumferential surface of a through-hole 420 formed in the substrate 400.

Here, the first electrode 100 may include the unit electrode 120 and an electrode conductive wire 140 connected to the unit electrode 120, and the electrode conductive wire 140 connected to one side of the unit electrode 120 may be connected to an external power supply.

Here, the unit electrodes 120 may be disposed at an upper portion of the through-hole 420 of the substrate 400 or extend from an upper end to a lower end of the through-hole 420 and spaced by a preset distance from each other as illustrated in FIG. 1 when a voltage is individually applied.

Although the first electrode 100 includes four unit electrodes 120 in the first embodiment to be described below, the first electrode 100 may have one of configurations of including 6, 8, 10, or 12 unit electrodes 120 as long as the first electrode 100 performs the above-described functions.

Here, the second electrode 200 may not be provided in plurality and may be spaced a preset distance d from the first electrode 100 based on a lower portion of the substrate 400.

Here, the preset distance d will be described later. When the second electrode 200 is described in detail, the second electrode 200 may include a second electrode conductive wire 240 and be connected with the external power supply to have a polarity different from that of the first electrode 100.

Specifically, the second electrode may have a circular band shape that is spaced the preset distance d from the through-hole 420.

Here, when a positive (+) voltage is applied to the first electrode 100 from the external power supply, a negative (−) voltage may be applied to the second electrode 200, but when a function of deforming a shape of the transmissive part 300, which will be described later, in three dimensions is performed, the negative (−) voltage may be applied to the first electrode 100, and the positive (+) voltage may be applied to the second electrode 200. However, the embodiment of the present invention is not limited thereto.

The transmissive part 300 may be formed of an electro-active polymer (hereinafter, referred to as EAP) so as to change a location of a focal point of light passing through the transmissive part 300 in three dimensions.

Specifically, the transmissive part 300 may be formed of a conductive polymer or one of a single-wall carbon nanotube, a multi-wall carbon nanotube, a nafion polymer, and SSEBS Also, the transmissive part 300 may be formed in the form of a transparent gel-type polymer. The transmissive part 300 is essentially transparent to perform a role of a lens. The transmissive part 300 may be formed in the form of gel having a predetermined shape instead of liquid having a surface shape deformed according to whether a voltage is applied.

To this end, the transmissive part 300 may be formed of a general purpose polymer such as polyvinyl chloride (PVC) and polyethylene.

Due to the above-described reason, when a voltage is applied to the first electrode 100 and the second electrode 200, the shape of the transmissive part 300 may be deformed in three dimensions to change the location of the focal point of the light passing through the transmissive part 300 in three dimensions.

Specifically, as the transmissive part 300 is designed to have a partial surface 320 protruding in the form of a convex lens on a main body having a flat plate shape, the shape of the transmissive part 300 may be deformed in three dimensions to change the location of the focal point of light passing through the partial surface 320 in three dimensions when a voltage is applied to the first electrode 100 and the second electrode 200, which are spaced the preset distance d from each other and disposed below the substrate 400.

Figure 2:
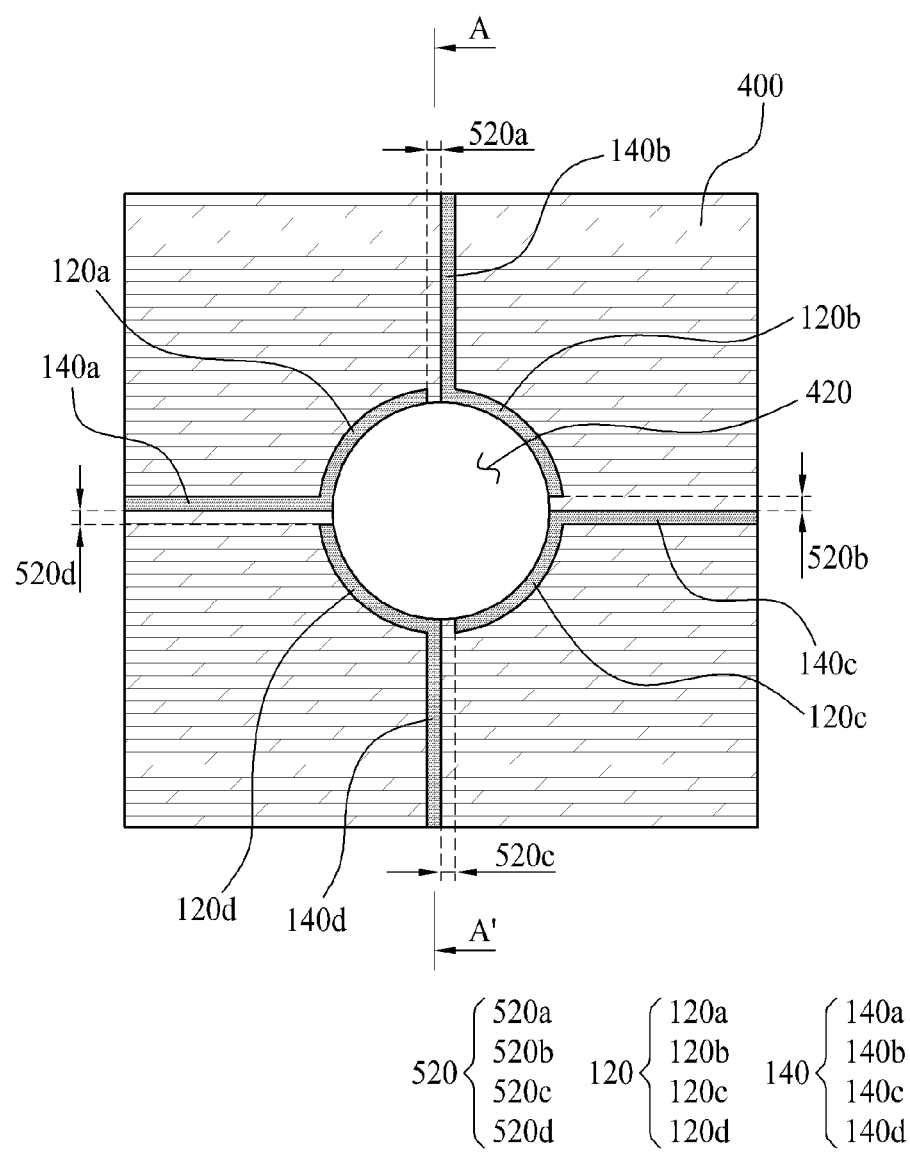
FIG. 2 is a top view illustrating a substrate including a plurality of first electrodes and a distortion prevention part of the electro-responsive gel lens having the automatic multifocal and image stabilization functions according to the first embodiment of the present invention.

For example, the partial surface 320 of the transmissive part 300 may have a hemisphere shape in which a lower portion is not provided based on a central axis of a sphere as illustrated in FIG. 1 and have a semicircle shape in a cross-sectional view taken along line A-A' in FIG. 2.

That is, the transmissive part 300 may be formed such that the partial surface 320 is formed on the body having a cuboid shape through which light passes, and the partial surface 320 having the hemisphere shape protrudes from the body having the cuboid shape.

Here, the partial surface 320 having the hemisphere shape and protruding from the body may be inserted to the through-hole 420 and exposed to incident light Lpaa. The partial surface 320 may be asymmetrically deformed when a voltage is applied to the first electrode 100 and the second electrode 200.

Also, the transmissive part 300 may be formed as one body in which the partial surface 320 protrudes to the through-hole 420 and exposed to the incident light Lpaa when a voltage is applied.

In other words, the substrate 400 in which the first electrode 100 and the second electrode 200 are disposed may be disposed on the transmissive part 300, and the partial surface 320 may be exposed through the through-hole 420 defined in the substrate 400.

Here, when a voltage is applied to the first electrode 100 and the second electrode 200, the partial surface 320 may be deformed to perform the role of the lens.

Also, the transmissive part 300 may further include an insulation member for insulating a bottom surface thereof Specifically, the insulation member may be formed to surround an entire surface of the transmissive part 300 and formed in a shape of a transparent glass substrate, a transparent plastic film, or a sheet substrate so as to have a high transmittance for allowing the incident light Lpaa to pass therethrough.

Here, the second electrode 200 may be deposited on a transparent glass substrate disposed below the transmissive part 300 instead of below the substrate 400 according to a target voltage between the first electrode 100 and the second electrode 200.

The above-described substrate 400 may be a printed circuit board formed to effectively constitute the first electrode 200 and the second electrode 300.

Here, the substrate 400 may include various structures, shapes, and materials as long as the substrate 400 performs a function of deforming the shape of the partial surface 320 of the transmissive part 300. However, the embodiment of the present invention is not limited thereto.

When the embodiment illustrated in the drawing is described for further detailed description, for example, the through-hole 420 may be defined in the substrate 400.

Here, the through-hole 420 may correspond to a diameter of the partial surface 320 to perform the role of the lens as the incident light Lpaa passes through the partial surface 320 exposed in the hemisphere shape.

Here, when the shape of the partial surface 320 may be deformed as the partial surface 320 contacts the first electrode 200 formed in the through-hole 420, the through-hole 420 may have various locations. However, it will be more convenient that the through-hole 420 is formed at a central side of the substrate 400, and the partial surface 320 is exposed to the through-hole 420.

When the preset distance d, which is described above, is described in detail with reference to FIG. 2, the preset distance d may be a spaced distance between the first electrode 100 and the second electrode 200 based on the lower portion of the substrate 400.

Since the preset distance d is inversely proportional to intensity of an electric field formed between the first electrode 100 and the second electrode 200, the preset distance d may be set in correspondence to a voltage in a preset range, which is applied to the transmissive part 300.

Specifically, a distance between the first electrode 100 and the second electrode 200 may be set in advance to deform the shape of the transmissive part 300 into a preferred shape with a minimum electric power supplied between the first electrode 100 and the second electrode 200 from the external power supply.

Here, when the preset distance d on the substrate 400 is extremely close, the first electrode 100 and the second electrode 200 may be short-circuited to generate an overcurrent. Also, when the preset distance d on the substrate 400 is extremely far, the first electrode 100 and the second electrode 200 may not be electrically connected.

Due to the above-described reason, the range of the voltage necessary for deforming the shape of the transmissive part 300 may be variously set in consideration of the above-described short-circuit and electrical connection. However, the embodiment of the present invention is not limited thereto.

For further detailed description, for example, it will be more convenient that the preset distance d is set in advance to set the above-described range of the voltage in a range from 1 V to 10 V in terms of voltage adjustment.

Figure 3:
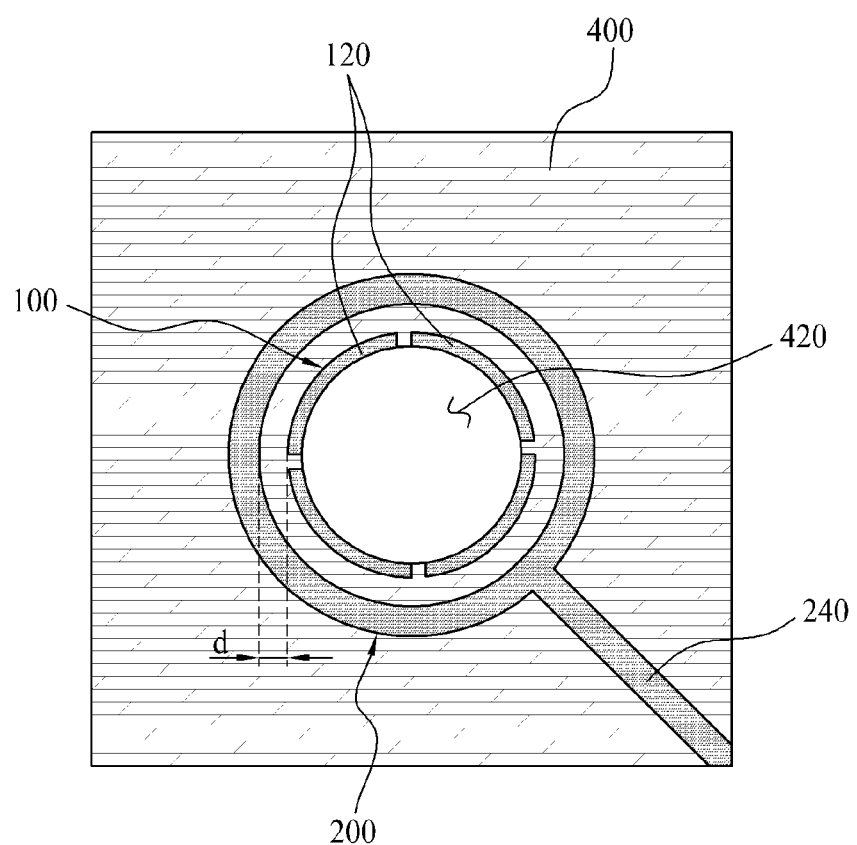
FIG. 3 is a bottom view illustrating a substrate including a first electrode and a second electrode of the electro-responsive gel lens having the automatic multifocal and image stabilization functions according to the first embodiment of the present invention.
Figure 4:
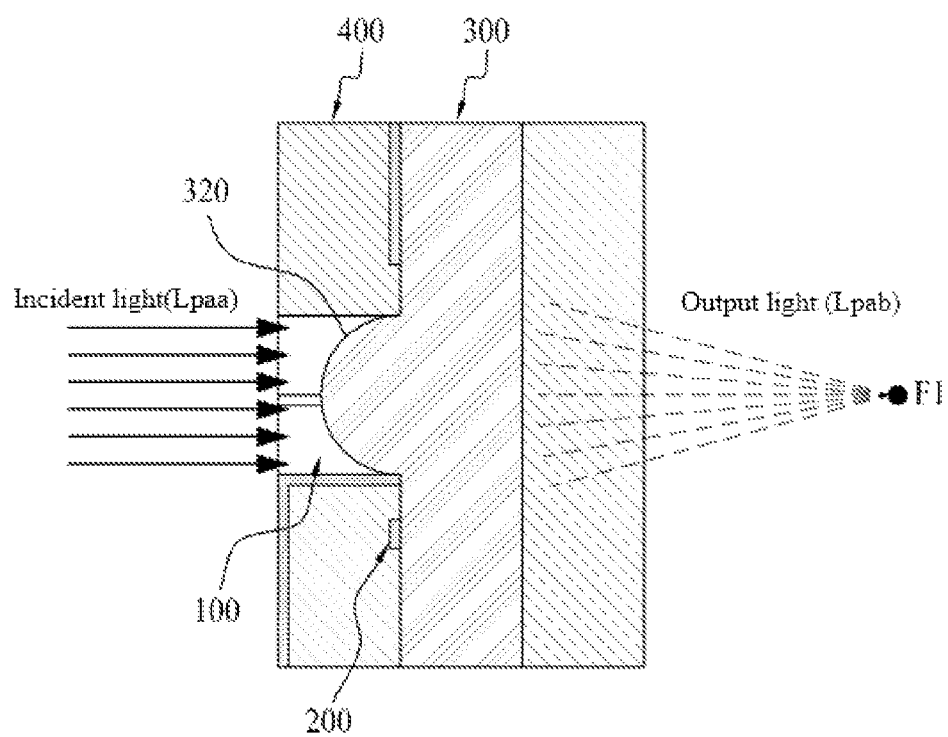
FIG. 4 is a cross-sectional view taken along line A-A' of FIG. 1 and illustrating a state before a voltage is applied to a plurality of unit electrodes of the electro-responsive gel lens having the automatic multifocal and image stabilization functions according to the first embodiment of the present invention.
Figure 5:
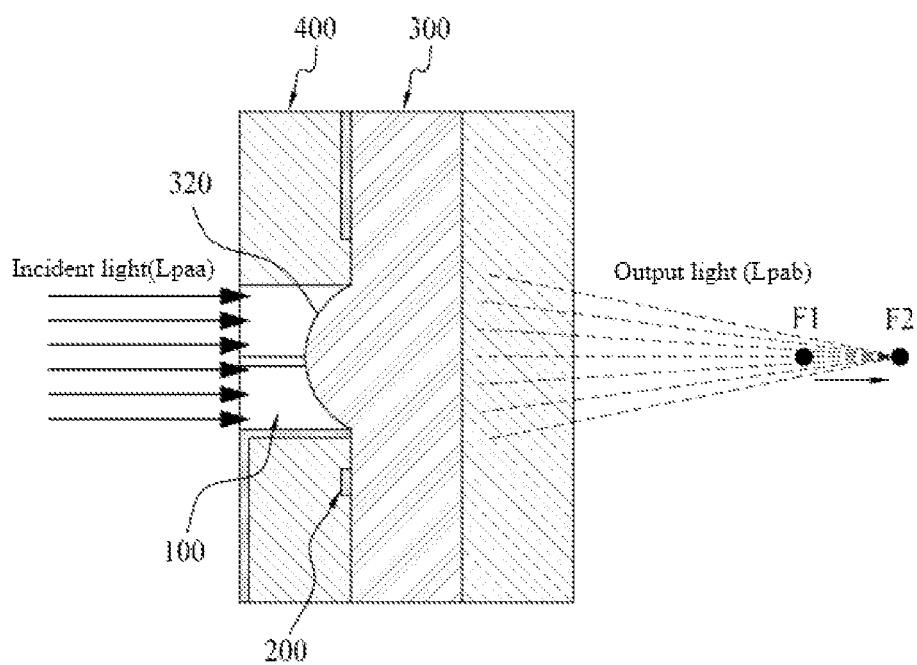
FIG. 5 is a cross-sectional view taken along line A-A' of FIG. 1 and illustrating a state in which a focal point increases in an optical axis direction as a uniform voltage is applied to the plurality of unit electrodes of the electro-responsive gel lens having the automatic multifocal and image stabilization functions according to the first embodiment of the present invention.

Hereinafter, the plurality of first electrodes 100 to which the voltage is individually applied from the external power supply will be described in detail with reference to FIG. 3 illustrating an upper portion of the substrate 400.

Specifically, the unit electrode 120 of the first electrode 100 may be configured such that four unit electrodes 120a, 120b, 120c, and 120d having the same shape are spaced a preset distance from each other along the through-hole 420 of the substrate 400.

Also, the unit electrodes 120a, 120b, 120c, and 120d may be connected to the external power supply through first electrode conductive wires 140a, 140b, 140c, and 140d, respectively.

For example, each of the unit electrodes 120a, 120b, 120c, and 120d may have a circular arc shape to contact the inner circumferential surface of the through-hole 420 defined in the substrate 400.

Here, the first electrode conductive wires 140a, 140b, 140c, and 140d each having a bar shape may be respectively provided on one ends of the unit electrodes 120a, 120b, 120c, and 120d and extend until an outer circumferential surface of the substrate 400 to be connected with an external electrode.

Here, the preset distance will be described later, and a principle and a shape of a focal point of output light Lpab passing through the transmissive part 300 is changed in an optical axis direction according to the voltage that is individually applied to the unit electrodes 120a, 120b, 120c, and 120d will be described below.

Firstly, the partial surface 320 protruding in the semicircular shape in a state in which the voltage is not applied to the first electrode 100 and the second electrode 200 transmits the incident light Lpaa and collects the output light Lpab to a focal point F1.

Here, the transmissive part 300 may be formed of an electro-active polymer (hereinafter, referred to as EAP) having a property of being maximally close to an electrode to which a voltage is applied and contact the first electrode 100 and the second electrode 200 disposed in the substrate 400 stacked on the transmissive part 300.

In this case, the transmissive part 300 may be exposed to an upper side of the substrate 400 according to the voltage applied to the first electrode 100 and the second electrode 200 and perform the role of the lens as the partial surface 320 is deformed when the voltage is applied to the first electrode 100 and the second electrode 200.

In other words, as the shape of the partial surface 320 of the transmissive part 300, which contacts one side of the first electrode 100 and the second electrode 200 to which the voltage is individually applied, is deformed in three dimensions, the focal point F1 of the output light Lpab may be changed.

Hereinafter, the change of the focal point due to the three-dimensional shape deformation of the partial surface 320 will be described in detail. Firstly, when a voltage of 10 V is applied to all of the unit electrodes 120a, 120b, 120c, and 120d, the partial surface 320 having the semicircular shape may be deformed to have an increased radius of curvature.

Thus, a focal distance F2 of the output light Lpab may become longer than a focal distance F1 as the incident light Lpaa passes through, and the focal point may be changed along an optical axis (e.g., a Z-axis).

On the other hand, when a voltage of 5 V is applied to at least one of the unit electrodes 120a, 120b, 120c, and 120d, and a voltage of 10 V is applied to the rest, the partial surface 320 having an asymmetric shape having an inclination based on a vertical axis (e.g., a X-axis or a Y-axis) of the optical axis (e.g., the Z-axis) may be formed.

Figure 6:
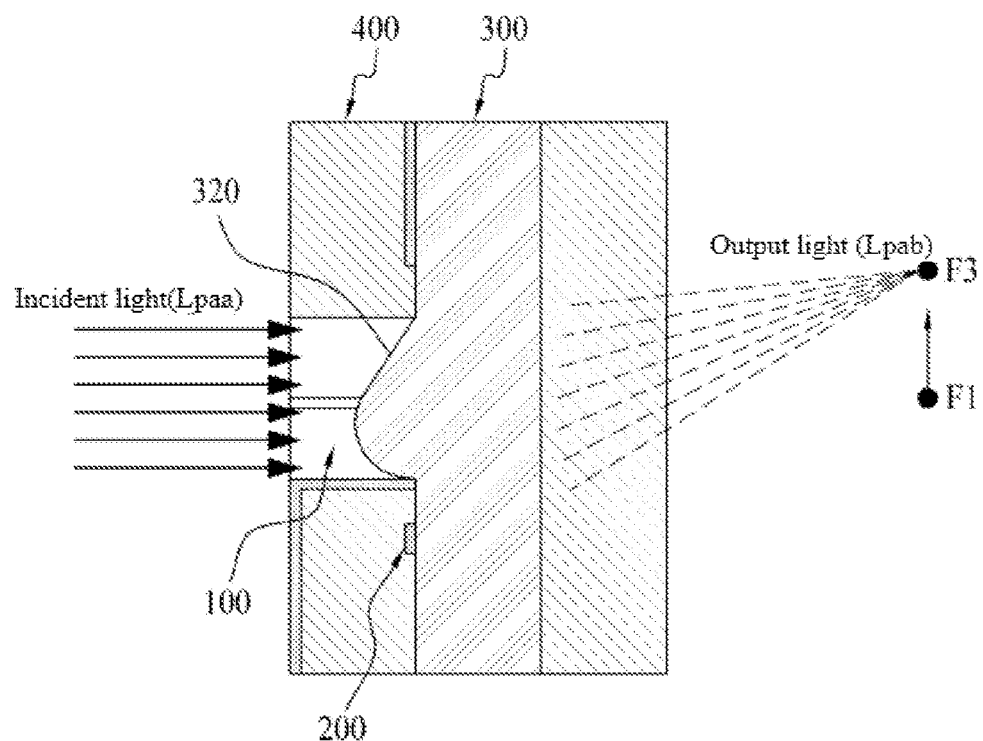
FIG. 6 is a cross-sectional view taken along line A-A' of FIG. 1 and illustrating a state in which the focal point is concentrated to one side of a vertical direction based on the optical axis direction as a voltage is individually applied to the plurality of unit electrodes of the electro-responsive gel lens having the automatic multifocal and image stabilization functions according to the first embodiment of the present invention.
Figure 7:
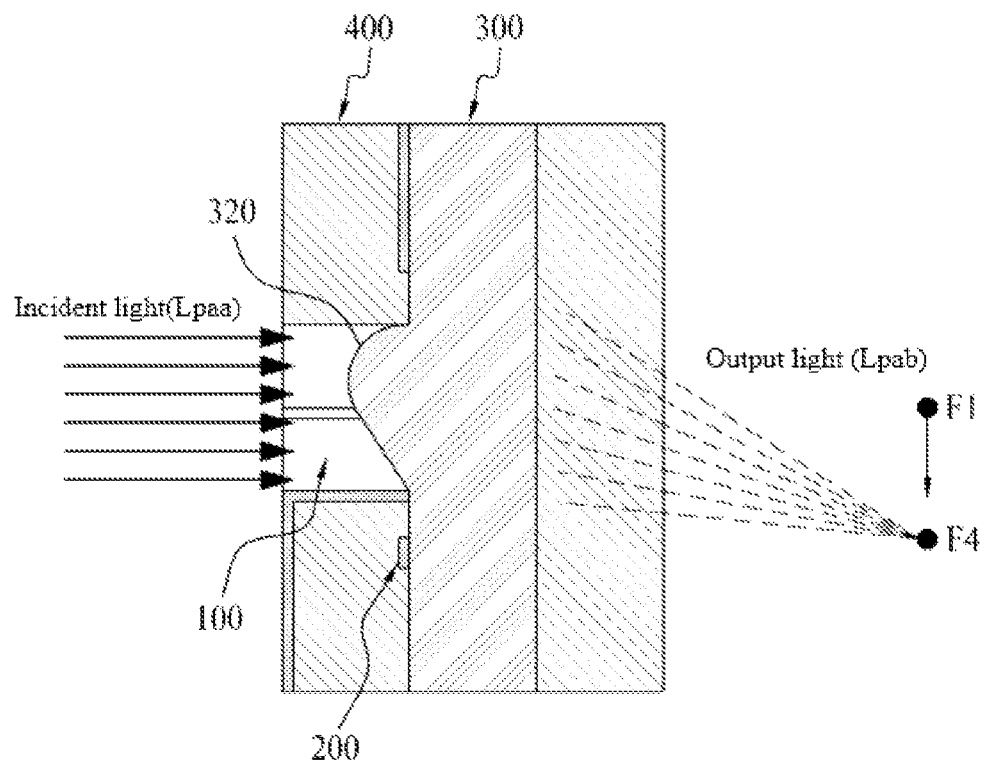
FIG. 7 is a cross-sectional view taken along line A-A' of FIG. 1 and illustrating a state in which the focal point is concentrated to the other side of the vertical direction based on the optical axis direction as a voltage is individually applied to the plurality of unit electrodes of the electro-responsive gel lens having the automatic multifocal and image stabilization functions according to the first embodiment of the present invention.

Hereinafter, focal point change in the X-axis or the Y-axis will be described in detail with reference to FIGS. 6 and 7.

As the voltage applied to at least one of the unit electrodes 120a, 120b, 120c, and 120d is different, the partial surface 320 having the asymmetric shape may be formed. Also, when the vertical axis of the optical axis is assumed as the X-axis, the partial surface 320 may have an inclination based on a X-axis direction, and as the output light Lpab is concentrated to one side because the incident light Lpaa passes through the inclined partial surface 320, the focal point may be changed from F1 to F3 as in FIG. 6 or from F1 to F4 as in FIG. 7.

In other words, as the partial surface 320 having the asymmetric shape having the inclination is formed, the focal point change in the X-axis or the Y-axis may be performed.

This is because an automatic focal point distance is adjusted in the optical direction as the focal point of the light passing through the transmissive part 300 is changed in three dimensions, and optical image stabilization may be performed without securing a separate space by changing the focal point in the vertical direction based on the optical direction.

The electro-responsive gel lens 10 having automatic the multifocal and image stabilization functions and having the above-described configuration may further include a distortion prevention part 500.

The distortion prevention part 500 may prevent a shape distortion of the transmissive part 300 by blocking mutual electrical interference between the plurality of unit electrodes 120.

Specifically, the distortion prevention part 500 may be a preset area formed on the substrate 400 so that the unit electrodes 120 are spaced a preset distance from each other, and an insulating material may be applied onto the preset area of the substrate 400 to double-block the interference between the unit electrodes 120.

Here, the insulating material may be applied onto the preset area by using one of a non-metal thermal spraying method, a screen printing method, and a resin film adhesion method, which are methods for applying an insulation property and a heat resistance to metal in an area formed between the plurality of first electrodes 100 among metal surface treatment technologies.

The insulating material applied onto the preset area may have various structures, shapes, and materials as long as the insulating material performs a function of blocking the interference between the unit electrodes 120. However, the embodiment of the present invention is not limited thereto.

Hereinafter, the distortion prevention part 500 according to the first embodiment will be further described in detail with reference to FIG. 3.

As described above, the unit electrodes 120a, 120b, 120c, and 120d of the first electrode 100 may be formed on the substrate 400 along the through-hole 420.

Here, the unit electrodes 120a, 120b, 120c, and 120d of the first electrode 100 may be spaced the preset distance from each other by the distortion prevention part 500 formed of areas 520a, 520b, 520c, and 520d, and the unit electrodes 120a, 120b, 120c, and 120d may be connected to the external power supply by the first electrode conductive wires 140a, 140b, 140c, and 140d, respectively.

That is, the distortion prevention part 500 may be an area formed on the through-hole 420 so that the unit electrodes 120a, 120b, 120c, and 120d of the first electrode 100 formed in the through-hole 420 are spaced the preset distance from each other.

Here, the above-described areas 520a, 520b, 520c, and 520d may have a length corresponding to that of the through-hole 420.

That is, the distortion prevention part 500 may have a length corresponding to that of the substrate 400.

As described above, the distortion prevention part 500 may have the same width as the preset distance between the unit electrodes 120a, 120b, 120c, and 120d of the first electrode 100 and the length corresponding to that of the through-hole 420.

The above-described two shapes may be mixed as illustrated in the drawings, or another shape that is different from those in the drawings may be formed. However, the embodiment of the present invention is not limited thereto.

However, the method of mixing the two shapes as illustrated in the drawings may simply block the electrical interference between the plurality of unit electrodes 120a, 120b, 120c, and 120d of the first electrode 100.

The preset distance, which is described above, may be changed according to the diameter of the through-hole 420 and designed in inversely proportional to the number of the plurality of electrodes.

Here, the preset distance may be designed in consideration of the voltage applied to the first electrode 100 and the second electrode 200 so as to realize a target shape of the partial surface 320 of the transmissive part 300.

Specifically, the preset distance may be in a range from 50 μm to 1000 μm. When the distance between the plurality of electrodes is less than 50 μm, as short circuit or electrical interference is generated between the plurality of electrodes, the voltage that is individually applied may be deviated from the target voltage, and thus the target shape may be deformed. As a result, the focal point of the output light Lpab passing through the transmissive part 300 may not be moved in a preferred direction.

When the distance between the plurality of electrodes is greater than 1000 μm, a shape deformation range of the transmissive part 300 may be restricted because an area to which a voltage is not applied is formed between one side of the partial surface 320 of the transmissive part 300 deformed in correspondence to a first electrode 120a to which the voltage is individually applied and the other side of the partial surface 320 of the transmissive part 300 deformed in correspondence to a first electrode 120b to which the voltage is individually applied. Thus, a focal point movement range of the output light Lpab passing through the transmissive part 300 may be restricted.

Thus, as the distance between the plurality of first electrodes 100 is set in the range from 50 μm to 1000 μm, shape distortion including distortion of the target shape of the partial surface 320 in the transmissive part 300 may be prevented, and thus an error of a three-dimensional focal point movement may be prevented.

Figure 8:
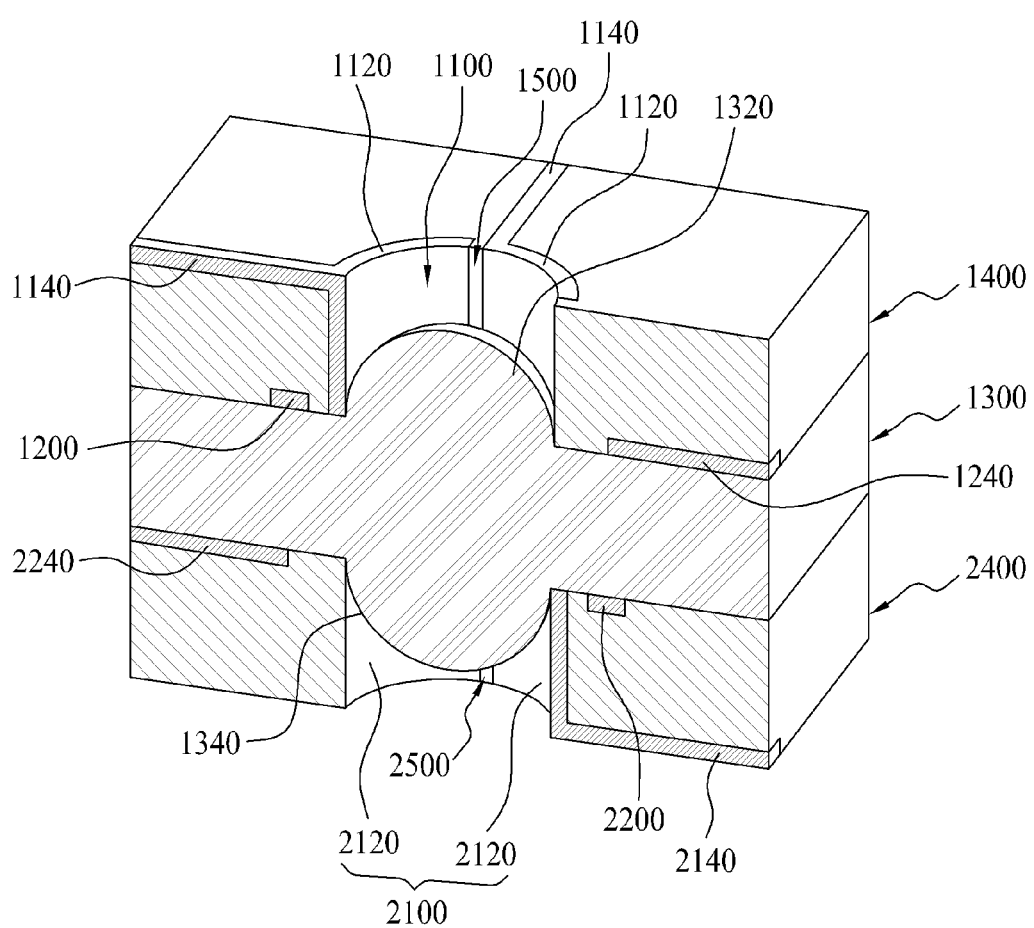
FIG. 8 is a schematic cross-sectional view illustrating an electro-responsive gel lens having automatic multifocal and image stabilization functions according to a second embodiment of the present invention.

Referring to FIG. 8, an electro-responsive gel lens 20 having automatic multifocal and image stabilization functions according to a second embodiment of the present invention may include a first upper electrode 1100, a second upper electrode 1200, an upper substrate 1400, a transmissive part 1300, a first lower electrode 2100, a second lower electrode 2200, and a lower substrate 2400.

Also, the electro-responsive gel lens 20 may further include an upper distortion prevention part 1500 and a lower distortion prevention part 2500.

Specifically, as the upper substrate 1400 in which an upper through-hole 1420 is formed and the lower substrate 2400 in which a lower through-hole 2420 is formed at a location corresponding to the upper through-hole 1420 are disposed, and the transmissive part 1300 is formed between the upper substrate 1400 and the lower substrate 2400, partial surfaces 1320 and 1340 may be exposed to the upper through-hole 1420 and the lower through-hole 2420, respectively.

Here, the upper distortion prevention part 1500 may be formed between the first upper electrodes 1100 disposed in the upper through-hole 1420, and the lower distortion prevention part 2500 may be formed between the first lower electrodes 2100 disposed in the lower through-hole 1520.

Here, a first partial surface 1320 may be formed at one side of the transmissive part 1300, and a second partial surface 1340 may be formed at the other side of the transmissive part 1300. As same as the first embodiment, the transmissive part 1300 may be formed of an electro-active polymer (hereinafter, referred to as EAP). When a voltage is applied to the first upper electrode 1100 and the second upper electrode 1200, a shape of the transmissive part 1300 may be deformed in three dimensions so as to change a location of a focal point of light passing through the first partial surface 1320 in three dimensions, and when a voltage is applied to the first lower electrode 2100 and the second lower electrode 2200, a shape of the transmissive part 1300 may be deformed in three dimensions so as to change a location of a focal point of light passing through the second partial surface 1340 in three dimensions.

That is, the transmissive part 1300 may be formed in a shape of a biconvex lens to change a focal point in three dimensions at all of upper and lower sides based on the transmissive part 1300.

Figure 9:
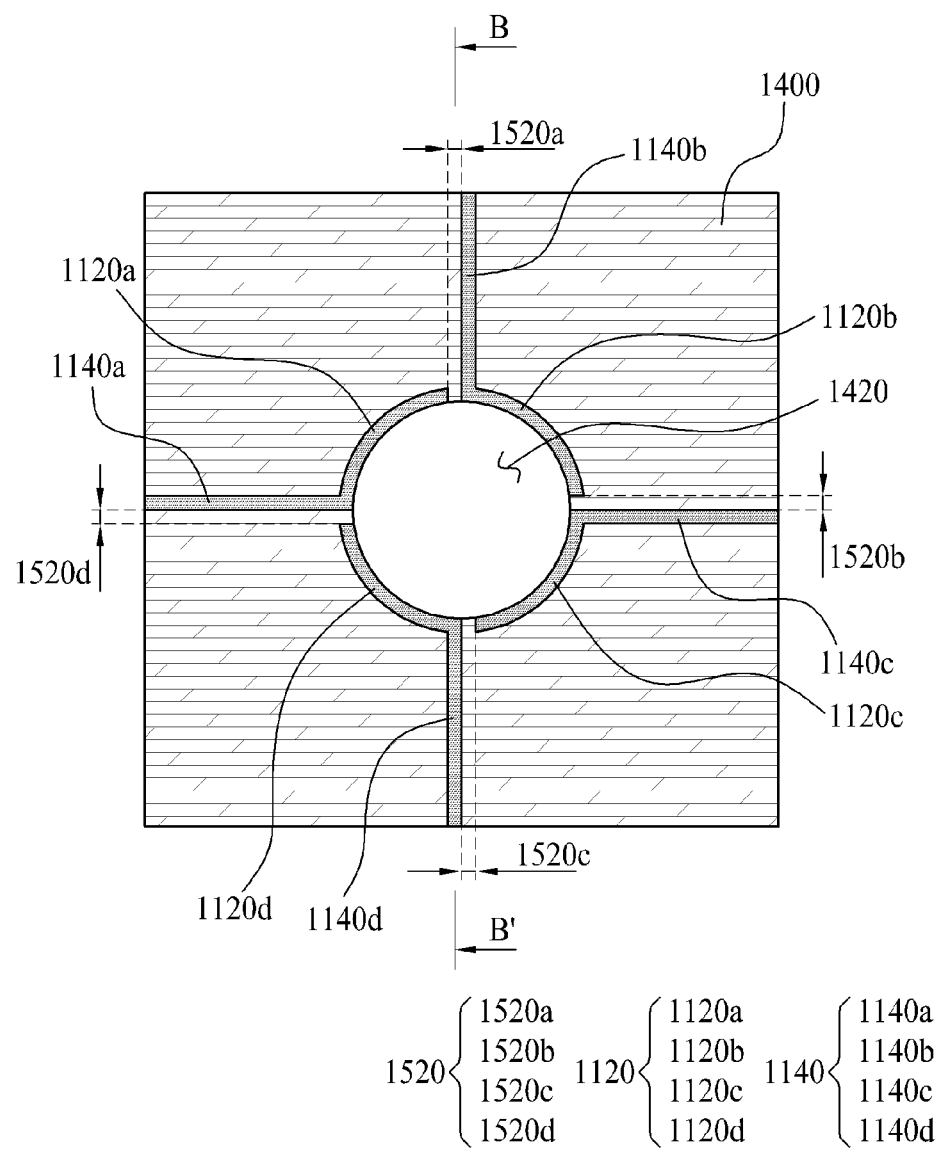
FIG. 9 is a top view illustrating an upper substrate including a plurality of first upper electrodes and a first distortion prevention part of the electro-responsive gel lens having the automatic multifocal and image stabilization functions according to the second embodiment of the present invention.

Hereinafter, the first upper electrode 1100 of the electro-responsive gel lens 20 having a variable focal point in three dimensions according to the second embodiment will be described with reference to FIG. 9. The upper through-hole 1420 may be formed on the upper substrate 1400, and the first upper electrode 1100 may include a plurality of upper unit electrodes 1120 each having a positive (+) electrode, which are disposed on the upper substrate 1400 along an inner circumferential surface of the upper through-hole 1420.

Specifically, the first upper electrode 1100 may include an upper unit electrode 1120 and a first upper conductive wire 1140, the upper unit electrodes 1120 may be spaced a preset distance from each other from an upper end to a lower end of the upper through-hole 1420, and the first upper conductive wire 1140 disposed on the upper substrate 1400 may be connected to an external power supply.

Figure 10:
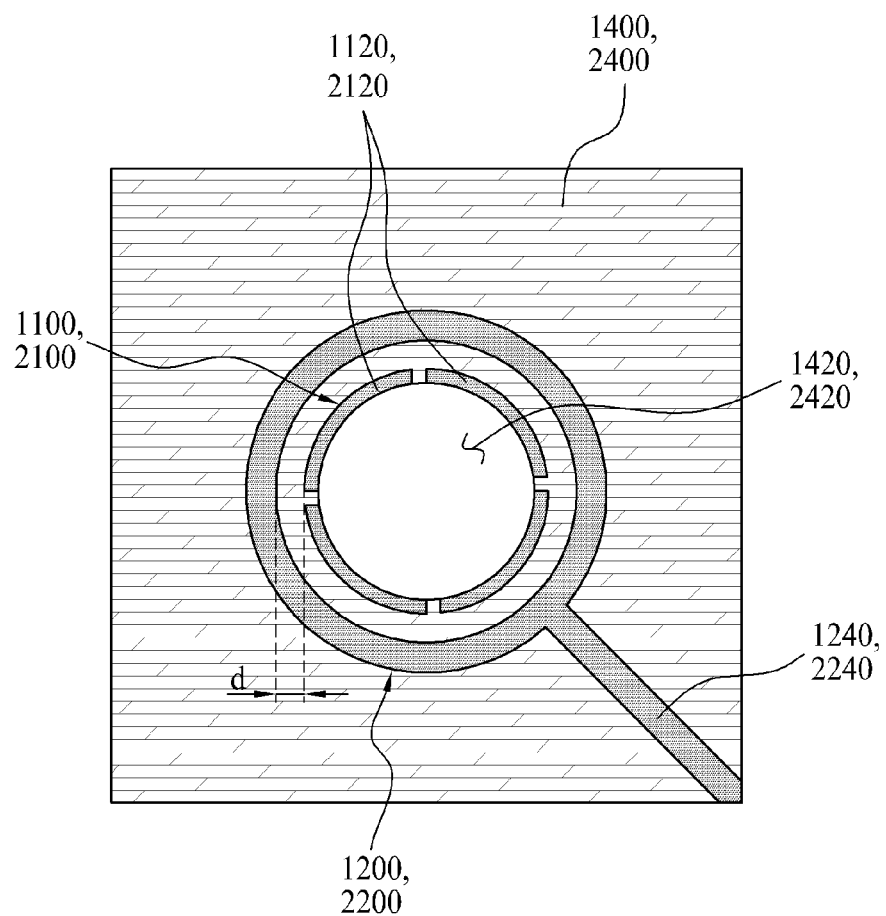
FIG. 10 is a view illustrating a lower portion of an upper substrate including a second upper electrode and a lower portion of a lower substrate including a second lower electrode of the electro-responsive gel lens having the automatic multifocal and image stabilization functions according to the second embodiment of the present invention.

Referring to FIG. 10, the second upper electrode 1200 that is not provided in plurality may have a negative (−) electrode and be disposed below the upper substrate 1400. As one end of the second upper electrode 1200 is connected to a second upper electrode conductive wire 1240, the second upper electrode conductive wire 1240 may be connected to the external power supply.

Here, the second upper electrode 1200 may be spaced a preset distance d from the first upper electrode 1100 and disposed below the upper substrate 1400.

The transmissive part 1300 may be formed below the upper substrate 1400. Specifically, the first partial surface 1320 may be exposed to the upper through-hole 1420 of the upper substrate 1400.

That is, as the upper substrate 1400 including the first upper electrode 1100 and the second upper electrode 1200 is stacked on the transmissive part 1300, and the first partial surface 1320 is exposed through the upper through-hole 1420 formed in the upper substrate 1400, the first partial surface 1320 may be deformed to perform the role of the lens when the voltage is applied to the first upper electrode 1100 and the second upper electrode 1200.

Here, the second partial surface 1340 may be formed at a location opposed to the first partial surface 130 on a bottom surface of the transmissive part 1300, and the lower substrate 2400 may be disposed at a location opposed to the upper through-hole 1420 so as to perform the role of the lens as the second partial surface 1340 is exposed to the lower through-hole 2420 of the lower substrate 2400.

In other words, based on the lower substrate 2400, the transmissive part 1300 may be stacked on the lower substrate 2400, the upper substrate 1400 may be stacked on the transmissive part 1300, the first partial surface 1320 may be exposed through the upper through-hole 1420 formed in the upper substrate 1400, and the first partial surface 1320 may be deformed when a voltage is applied to the first upper electrode 1100 and the second upper electrode 1200.

Here, the first partial surface 1320 formed on the transmissive part 1300 may be exposed to the upper through-hole 1420, and the second partial surface 1340 formed below the transmissive part 1300 may be exposed to the lower through-hole 2420 of the lower substrate 2400.

Figure 11:
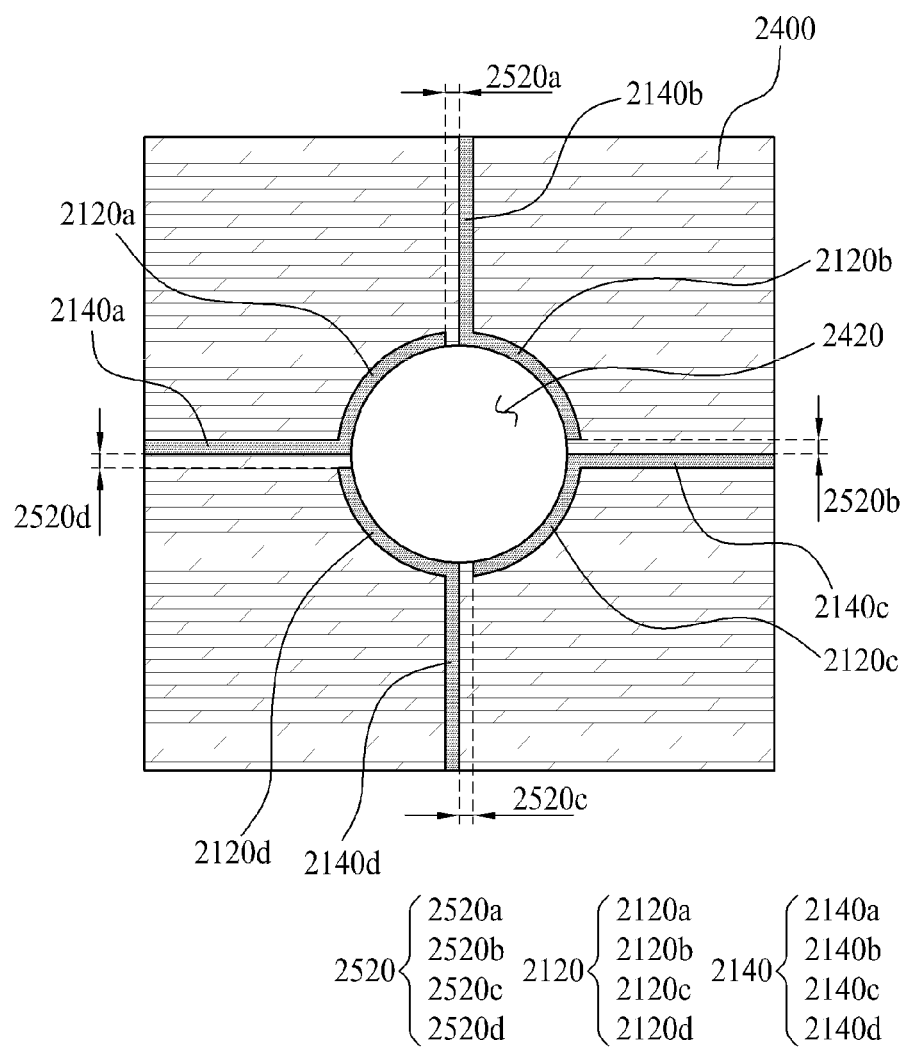
FIG. 11 is a bottom view illustrating the lower substrate including a first lower electrode and a second distortion prevention part of the electro-responsive gel lens having the automatic multifocal and image stabilization functions according to the second embodiment of the present invention.
Figure 12:
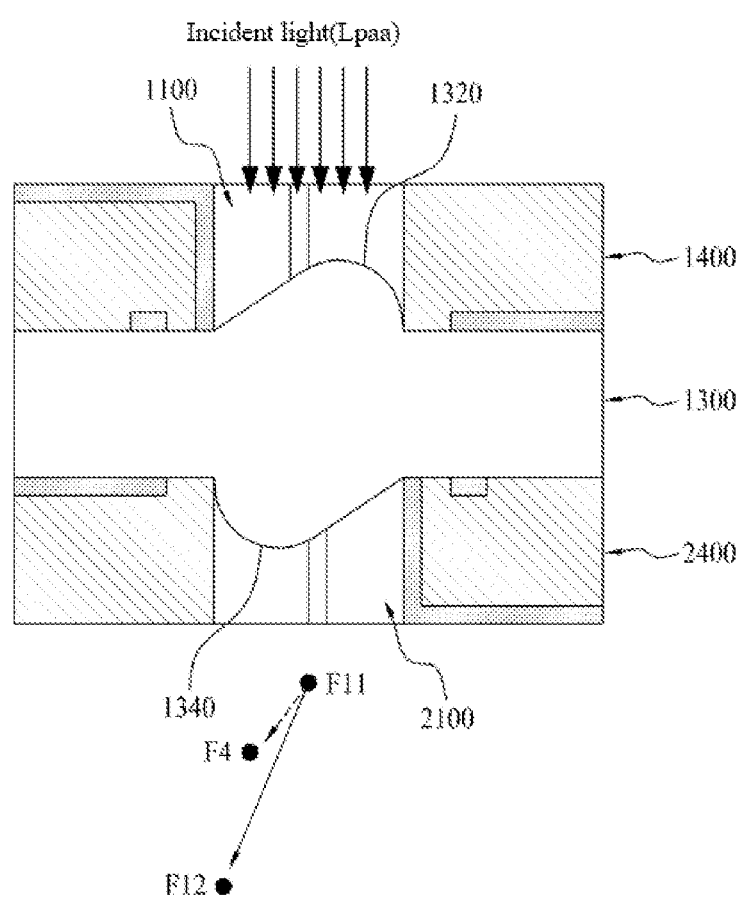
FIG. 12 is a cross-sectional view taken along line B-B' of FIG. 8 and illustrating a state in which a first partial surface and a second partial surface are asymmetric in a vertical direction when a voltage is individually applied to a plurality of unit electrodes of the electro-responsive gel lens having the automatic multifocal and image stabilization functions according to the second embodiment of the present invention.

Referring to FIG. 11, the first lower electrode 2100 may be formed in the lower through-hole 2420 as same as the first upper electrode 1100 and the second upper electrode 1200 are disposed in the upper through-hole 1420, and the first lower electrode 2100 may include a plurality of lower unit electrodes 2120 each having a positive (+) electrode, which are disposed at a lower portion of the lower substrate 2400 along an inner circumferential surface of the lower through-hole 2420.

Specifically, the first lower electrode 2100 may include a lower unit electrode 2120 and a first lower conductive wire 2140, the lower unit electrodes 2120 may be spaced a preset distance from each other from an upper end to a lower end of the lower through-hole 2420, and the first lower conductive wire 2140 disposed at the lower portion of the lower substrate 2400 may be connected to an external power supply.

Referring to FIG. 10 again, the second lower electrode 2200 that is not provided in plurality may have a negative (−) electrode and include a second lower electrode conductive wire 2240 disposed on the lower substrate 2400 and connected to the external power supply.

Here, although all of the first lower electrode 2100 and the second lower electrode 2200, which have the same shape, are illustrated in FIG. 10 for convenience, the first lower electrode 2100 is disposed below the upper substrate 1400, and the second lower electrode 2200 is disposed on the lower substrate 1400

As described above, control of a variable range and accuracy of the focal point may be improved by individually applying the voltage to the first upper electrode 1100 and the second upper electrode 1200 to deform the shape of the first partial surface 1320 in three dimensions and individually applying the voltage to the first lower electrode 2100 and the second lower electrode 2200 to deform the shape of the second partial surface 1330 in three dimensions.

Also, the preset distance d may be a spaced distance between the first upper electrode 1100 and the second upper electrode 1200 and a spaced distance between the first lower electrode 2100 and the second lower electrode 2200. Since the preset distance d have a function and a shape, which are the same as those of the preset distance d described in the first embodiment, a detailed description thereof will be omitted.

Also, each of the upper distortion prevention part 1500 and the lower distortion prevention part 2500 may have the same shape and function as those of the distortion prevention part 500 in the first embodiment.

That is, the upper distortion prevention part 1500 may be formed on the upper substrate 1400 and prevent a shape distortion of the transmissive part 1300 by blocking mutual electrical interference between the plurality of upper unit electrodes 1120.

Also, the lower distortion prevention part 2500 may be formed on the lower substrate 2400 and prevent the shape distortion of the transmissive part 1300 by blocking mutual electrical interference between the plurality of lower unit electrodes 2120.

Like the first embodiment, the preset distance may be also changed according to a diameter of each of the upper through-hole 1420 and the lower through-hole 2420 and designed in inversely proportional to the number of the plurality of electrodes.

Also, the preset distance may be designed in consideration of the voltage applied to the first lower electrode 2100 and the second lower electrode 2200 so that the second partial surface 1340 of the transmissive part 1300. Specifically, the preset distance may be in a range from 50 μm to 1000 μm.

In other words, as each of the distance between the plurality of first upper electrodes 1100 and the distance between the plurality of first lower electrodes 2100 is set in a range from 50 μm to 1000 μm, a shape distortion of a target shape of the first partial surface 1320 and the second partial surface 1340 may be prevented, and thus an error of three-dimensional focal point movement may be prevented.

Hereinafter, focal point variation of the three-dimensional focal point variable gel lens 20 according to the second embodiment will be described in detail.

By using the same method as the first embodiment, the first partial surface 1320 having the semicircular shape in a state in which a voltage is not applied to the first upper electrode 1100 and the second upper electrode 1200 transmits the incident light Lpaa, and the second partial surface 1340 having the semicircular shape in a state in which a voltage is not applied to the first lower electrode 2100 and the second lower electrode 2200 outputs the transmitted incident light Lpaa and collects the output light Lpab to a focal point F1.

For example, when the same voltage in a range from 1 V to 10 V is applied to each of upper unit electrodes 1120a, 1120b, 1120c, and 1120d, and, independently, the same voltage in a range from 1 V to 10 V is applied to each of lower unit electrodes 2120a, 2120b, 2120c, and 2120d, a focal point distance may be changed in the optical axis as much as two times of that in the first embodiment.

Also, like the first embodiment, when a voltage of 5 V is applied to at least one of the upper unit electrodes 1120a, 1120b, 1120c, and 1120d, and a voltage of 10 V is applied to the rest, the first partial surface 1320 having an asymmetric shape having an inclination based on a vertical axis (e.g., the X-axis or the Y-axis) of the optical axis (e.g., the Z-axis) may be formed, and when a voltage of 5 V is applied to at least one of lower unit electrodes 2120a, 2120b, 2120c, and 2120d, and a voltage of 10 V is applied to the rest, the second partial surface 1340 having an asymmetric shape having an inclination based on the vertical axis (e.g., the X-axis or the Y-axis) of the optical axis (e.g., the Z-axis) may be formed.

For example, when the vertical axis of the optical axis is the X-axis, the first partial surface 1320 having an asymmetric shape having an upward inclination from a left side to a right side may be formed by applying a different voltage to at least one of the upper unit electrodes 1120a, 1120b, 1120c, and 1120d, and the second partial surface 1340 having an asymmetric shape based on a horizontal cross-section at a central side of the transmissive part 1300 may be formed by applying a different voltage to at least one of the lower unit electrodes 2120a, 2120b, 2120c, and 2120d.

Specifically, the partial surfaces 1320 and 1340 having the asymmetric shape having an inclination are respectively provided to both surfaces of the transmissive part 1300, and all of the partial surfaces 1320 and 1340 are deformable, a focal point F11 passing through the transmissive part 1300 may be moved to a focal point F12.

Here, the changed focal point F12 may be further changed in the optical axis (Z-axis) and the vertical axis (X-axis or Y-axis) of the optical axis in comparison with the focal point F4 changed as only one partial surface 320 is disposed on a cross-section of the transmissive part 300 in the first embodiment.

That is, as a range of changing the focal point of the light passing through the transmissive part 1300 in three dimensions is expanded based on the first embodiment, automatic focal point distance adjustment in the optical axis direction may be performed, and the focal point may be changed in the vertical direction based on the optical axis direction to perform even the optical image stabilization without securing an extra space.

Hereinafter, a case when all of a first electrode 3100 and a second electrode 3200 are provided in plurality, and a voltage is individually applied will be described in detail.

Figure 13:
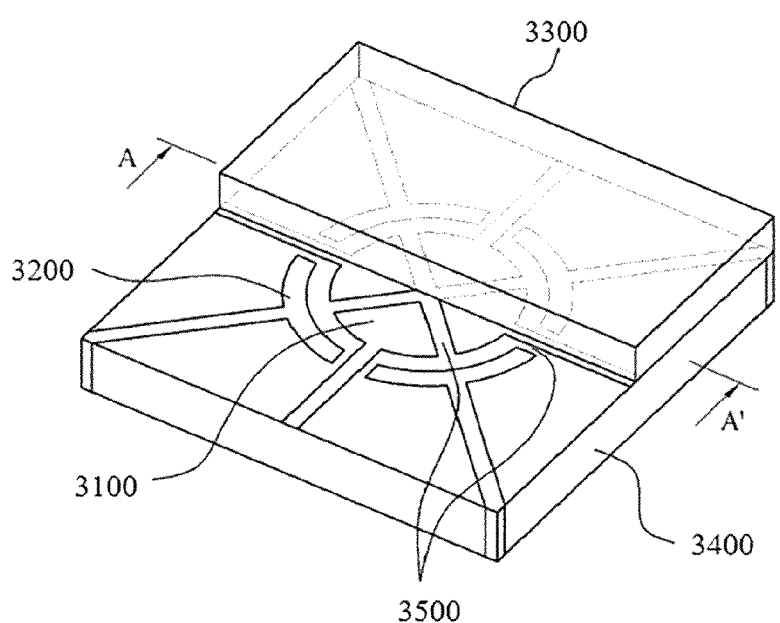
FIG. 13 is a schematic cross-sectional view illustrating an overall configuration of an electro-responsive gel lens having automatic multifocal and image stabilization functions according to a third embodiment of the present invention.

Referring to FIG. 13, an electro-responsive gel lens 30 having automatic multifocal and image stabilization functions may include a first electrode 3100, a second electrode 3200, and a transmissive part 3300.

Specifically, when each of the first electrode 3100 and the second electrode 3200 is provided in plurality and disposed in a substrate 3400, the first electrode 3100 may include a first unit electrode 3120 and a first electrode conductive wire 3140 connected to the first unit electrode 3120, and the first electrode conductive wire 3140 connected to one side of the first unit electrode 3120 may be connected to an external power supply.

Also, the plurality of second electrodes 3200 may include a second unit electrode 3220 and a second electrode conductive wire 3240 connected to the second unit electrode 3120, and the second electrode conductive wire 3240 connected to one side of the second unit electrode 3220 may be connected to an external power supply.

Here, a material used for the first electrode 3100 and the second electrode 3200 may be selected in consideration of chemical stability at the room temperature, a high visible light transmittance, and an excellent etching characteristic, and particularly, the material may be a transparent conductive film having both a high transmittance in a visible light region and a high electrical conductivity.

Specifically, when each of the first electrode 3100 and the second electrode 3200 is formed of a ITO transparent conductive film, each of the first electrode 3100 and the second electrode 3200 may be formed in a shape of a thin-film on the substrate 3400.

Specifically, the ITO transparent conductive film may be deposited on the substrate 3400 in a vacuum state by using a sputtering method, or ITO in the form of varnish may be applied onto the substrate 3400.

Figure 14:
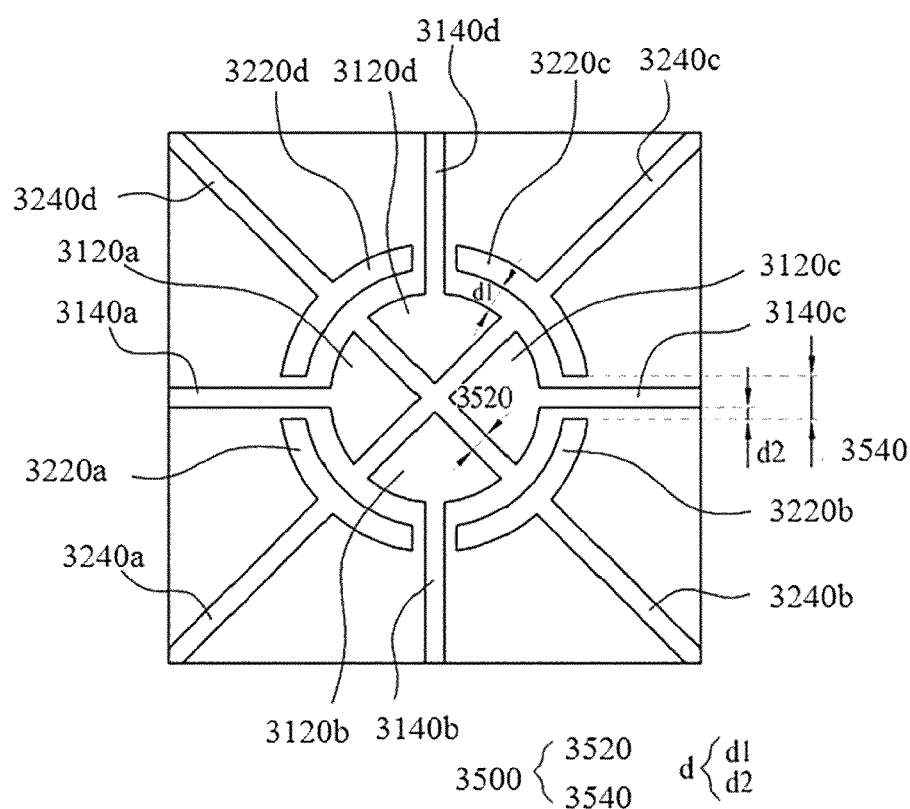
FIG. 14 is a view illustrating a state in which a distortion prevention part is formed on a substrate including a plurality of electrodes disposed on the same plane of the electro-responsive gel lens having the automatic multifocal and image stabilization functions according to the third embodiment of the present invention.

The above-described first electrode 3100 and second electrode 3200 will be described in more detail with reference to FIG. 14. The first electrode 3100 may include a plurality of first unit electrodes 3120a, 3120b, 3120c, and 3120d, and the second electrode 3100 may include a plurality of second unit electrodes 3220a, 3220b, 3220c, and 3220d.

Also, the second electrode 3200 may be disposed on the same plane as the first electrode 3100 and spaced a preset distance from the first electrode 3100 to surround a portion of the first electrode 3100.

Here, the substrate 3400 may be formed of a square flat plate through which light passes, and all of the first unit electrodes 3120a, 3120b, 3120c, and 3120d having the same shape may be formed at an upper central side of the substrate 3400 and spaced a preset distance from each other.

That is, the first unit electrodes 3120a, 3120b, 3120c, and 3120d may form an overall radial pattern on one surface of the substrate 3400, and first electrode conductive wires 3140a, 3140b, 3140c, and 3140d may be respectively disposed at one sides of the first unit electrodes 3120a, 3120b, 3120c, and 3120d, so that the external power supply is connected thereto.

Also, the first unit electrodes 3120a, 3120b, 3120c, and 3120d may have sector shapes having the same central angle, and the first electrode conductive wires 3140a, 3140b, 3140c, and 3140d may be respectively disposed at one sides of formed arcs.

Here, the first electrode conductive wires 3140a, 3140b, 3140c, and 3140d may contact one surface of the substrate 3400.

Also, the second unit electrodes 3220a, 3220b, 3220c, and 3220d may respectively include second electrode conductive wires 3240a, 3240b, 3240c, and 3240d so that the external power supply is connected thereto and respectively spaced a preset distance d1 or d2 from the first unit electrodes 3120a, 3120b, 3120c, and 3120d.

Specifically, one second unit electrode 3220c of the second unit electrodes has a bar shape having a curvature and surround a portion of each of one first unit electrode 3120c and another first unit electrode 3120d, and the second unit electrodes 3220a, 3220b, 3220c, and 3220d may form an overall radial pattern.

Here, the second unit electrode 3220c and the first unit electrode 3120c or 3120d may be spaced a preset distance d1 from each other Also, the second unit electrode 3220c may be spaced a preset distance d2 from the first electrode conductive wire 3140c connected to the first unit electrode 3120c.

Likewise, the second unit electrode 3220c may be spaced the preset distance d2 from the first electrode conductive wire 3140d connected to the first unit electrode 3120d.

Although disposed on the other side of the substrate 3400, a distance between another first electrode 3100 and another second electrode 3200, which are not described above, is equal to the distances d1 and d2.

That is, the preset distance d1 may be a spaced distance between the second unit electrode 3220 and the first unit electrode 3120 adjacent thereto, and the preset distance d2 may be a spaced distance between the second unit electrode 3220 and the first electrode conductive wire 3140 adjacent thereto.

In other words, the first electrode 3100 and the second electrode 3200 may be provided such that all of the first unit electrodes 3120a, 3120b, 3120c, and 3120d and the second unit electrodes 3220a, 3220b, 3220c, and 3220d may be spaced the preset distance d1 from each other, and all of the second unit electrodes 3220a, 3220b, 3220c, and 3220d and the first electrode conductive wires may be spaced the preset distance d2 from each other.

Here, the preset distance d1 and d2 between the first electrode 3100 and the second electrode 3200 may prevent short circuit between two electrodes.

Since the preset distance d1 and d2 is inversely proportional to intensity of an electric field formed between the first electrode 3100 and the second electrode 3200, the preset distance d1 and d2 may be set in correspondence to a voltage in a preset range, which is applied to the transmissive part 3300.

Specifically, when the preset distance d1 and d2 on the substrate is extremely close, the first electrode 3100 and the second electrode 3200 may be short-circuited to generate an overcurrent. Also, when the preset distance d1 and d2 on the substrate is extremely far, the first electrode 3100 and the second electrode 3200 may not be electrically connected.

A range of a voltage for deforming the shape of the transmissive part 3300 may be set in a range from 1 V to 10 V due to the same reason as the first embodiment.

The transmissive part 3300 may be formed on the substrate 3400 on which the first electrode 3100 and the second electrode 3200 are formed.

Figure 15:
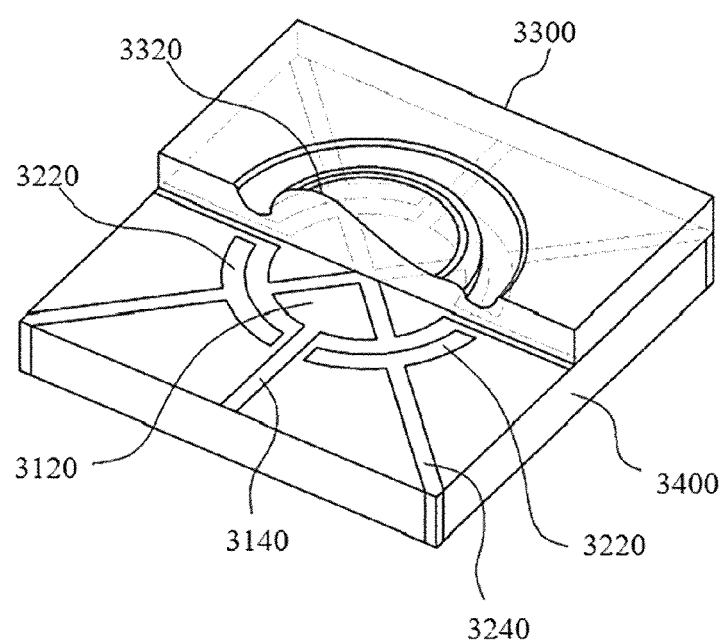
FIG. 15 is a schematic view illustrating a state in which a voltage is applied to the electro-responsive gel lens having the automatic multifocal and image stabilization functions according to the third embodiment of the present invention.

The transmissive part 3300 may be formed of an electroactive polymer and deformed in three dimensions as illustrated in FIG. 15 when a voltage is applied to the first electrode 3100 and the second electrode 3200, so that a location of a focal point of light passing through the transmissive part 3300 is changed in three dimensions.

Here, the transmissive part 3300 may be formed in the form of a transparent gel-type polymer as described through the first embodiment and the second embodiment.

Also, the transmissive part 3300 may be essentially transparent to perform the role of the lens and have a gel phase instead of liquid having a surface shape deformed according to whether a voltage is applied. The transmissive part 3300 may include various materials as long as the transmissive part 3300 performs the above-described functions.

Specifically, the transmissive part 3300 may be applied on a top surface of the substrate 3400 to completely cover the first electrode 3100 and the second electrode 3200 formed on the substrate 3400.

Also, the transmissive part 3300 may have a constant surface thickness when a voltage is not applied to the first electrode 3100 and the second electrode 3200.

The substrate 3400 may be a light transmissive substrate. Specifically, the substrate 3400 may be a component that provides a base for the first electrode 3100 and the second electrode 3200 and formed of one of a flexible substrate that is a flexible film material, a plate, or glass, preferably a material having high a light transmittance.

The electro-responsive gel lens 30 having the automatic the multifocal and image stabilization functions and having the above-described configuration may further include a distortion prevention part 3500.

Hereinafter, the distortion prevention part 3500 will be described in detail through above-described FIG. 14. The distortion prevention part 3500 may perform a role of preventing a shape distortion by blocking mutual electrical interference between the plurality of unit electrodes and be deformed according to a diameter of the partial surface 3320 protruding by an electrostatic repulsion force.

Specifically, the distortion prevention part 3500 may include a first unit electrode distortion prevention part 3520 and a second unit electrode distortion prevention part 3540 and may be a preset area formed on the substrate so that the first electrode 3100 and the second electrode 3200 are spaced the preset distance from each other. The distortion prevention part 3500 may include an insulation member on the preset area to double-block interference between the unit electrodes 3120.

For example, the first unit electrode distortion prevention part 3520 may be formed between the plurality of first unit electrodes 3120*a*, 3120*b*, 3120*c*, and 3120*d*, and the second unit electrode distortion prevention part 3520 may be formed between the plurality of second unit electrodes 3220*a*, 3220*b*, 3220*c*, and 3220*d* so that the first unit electrodes 3120*a*, 3120*b*, 3120*c*, and 3120*d* are spaced the preset distance from the second unit electrodes 3220*a*, 3220*b*, 3220*c*, and 3220*d*.

Here, the first unit electrode distortion prevention part 3520 may be an area having a 'X'-shape formed between the first unit electrodes 3120*a*, 3120*b*, 3120*c*, and 3120*d* so that the plurality of first unit electrodes 3120*a*, 3120*b*, 3120*c*, and 3120*d* are spaced the preset distance from each other.

Here, the area having the 'X'-shape may be divided into a plurality of bar shaped areas, and one bar shaped area may have a width equal to the preset distance between the plurality of first unit electrodes 3120*a*, 3120*b*, 3120*c*, and 3120*d*.

Also, the second unit electrode distortion prevention part 3540 may be an area formed between the second unit electrodes 3220*a*, 3220*b*, 3220*c*, and 3220*d* so that the plurality of second unit electrodes 3220*a*, 3220*b*, 3220*c*, and 3220*d* are spaced the preset distance from each other.

Here, the second unit electrode distortion prevention part 3540 may be designed in consideration of the preset distance d2 when the first electrode conductive wires 3140*a*, 3140*b*, 3140*c*, and 3140*d* are formed between the second unit electrodes 3220*a*, 3220*b*, 3220*c*, and 3220*d*.

Here, the preset distance may be equal to the width of each of the first unit electrode distortion prevention part 3520 and the second unit electrode distortion prevention part 3540 and designed in consideration of a voltage applied to the first electrode 3100 and the second electrode 3200 and in inversely proportional to the number of the plurality of electrodes so that the partial surface 3320 of the transmissive part 3300 is realized into the target shape.

Specifically, the preset distance may be in a range from 50 μm to 1000 μm. When the preset distance between the plurality of electrodes is less than 50 μm, as short circuit or electrical interference is generated between the plurality of electrodes, the voltage that is individually applied may be deviated from the target voltage, and thus the target shape may be deformed. As a result, the focal point of the output light Lpab passing through the transmissive part 3300 may not be moved in a preferred direction.

Hereinafter, a case when the preset distance between the plurality of electrodes is greater than 1000 μm will be described.

Firstly, when one side of the partial surface 3320 of the transmissive part 3300 deformed in correspondence to the first electrode 3120*a* to which a voltage is individually applied is assumed as A, and the other side of the partial surface 3320 of the transmissive part 3300 deformed in correspondence to the first electrode 3120*b* to which a voltage is individually applied is assumed as B, a shape deformation range of the transmissive part 3300 may be restricted because an area to which a voltage is not applied is formed between A and B.

Thus, a focal point movement range of the output light Lpab passing through the transmissive part 3300 may be restricted.

Thus, as the distance between the plurality of first electrodes 3100 is set in the range from 50 μm to 1000 μm, the shape distortion including distortion of the target shape of the partial surface 3320 in the transmissive part 3300 may be prevented, and thus an error of the three-dimensional focal point movement may be prevented.

A plurality of electro-responsive gel lenses 30 having the automatic multifocal and image stabilization functions and having the above-described configuration may be arranged in the form of a core light element array having various applied fields, particularly in the form of a micro lens array.

Figure 16:
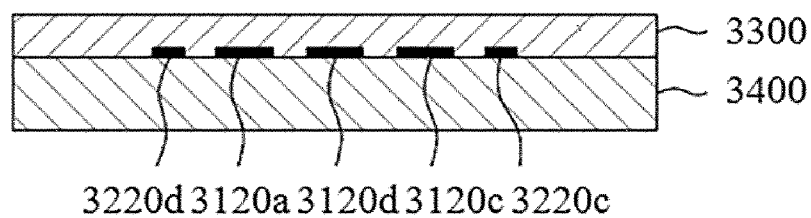
FIG. 16 is a cross-sectional view taken along line A-A' of FIG. 13 and illustrating a state in which a voltage is not applied to a first electrode and a second electrode of the electro-responsive gel lens having the automatic multifocal and image stabilization functions according to the third embodiment of the present invention.

Hereinafter, an operation of the electro-responsive gel lenses 30 having the automatic multifocal and image stabilization functions with reference to FIG. 16 illustrating a state in which a voltage is not applied will be described.

Firstly, when each of the plurality of first electrodes 3100 has a positive (+) electrode, and each of the plurality of second electrodes 3200 has a negative (−) electrode, a voltage may be supplied to the first electrode 3100 and the second electrode 3200 by the external power supply.

Figure 17:
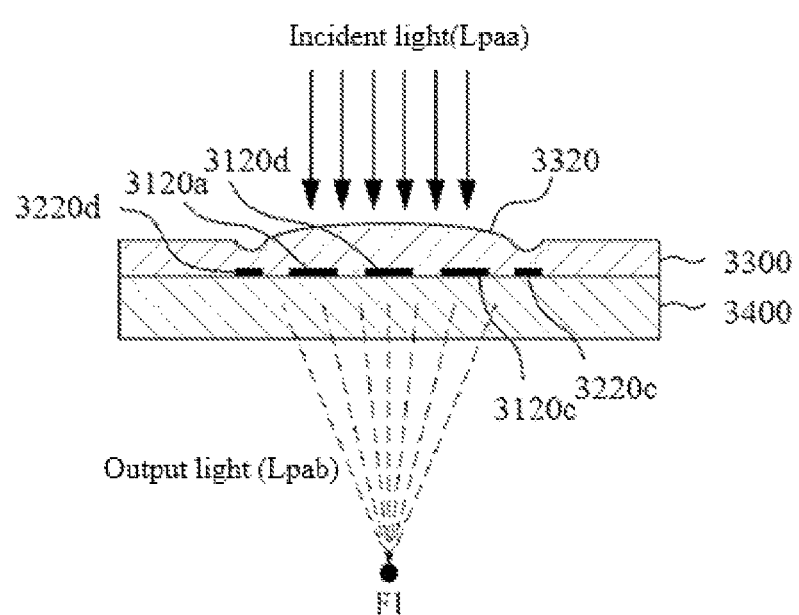
FIG. 17 is a cross-sectional view taken along line A-A' of FIG. 13 and illustrating a focal point of light passing through a three-dimensional focal point variable gel lens having a flat electrode when the same voltage is applied to the first electrode and the second electrode of the electro-responsive gel lens having the automatic multifocal and image stabilization functions according to the third embodiment of the present invention.
Figure 18:
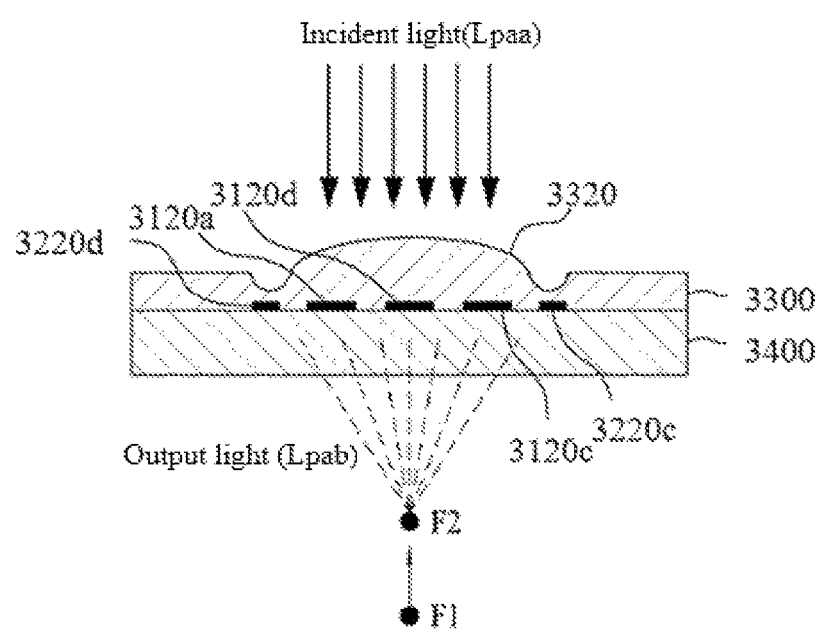
FIG. 18 is a cross-sectional view taken along line A-A' of FIG. 13 and illustrating a state in which a focal point distance of light decreases in an optical axis direction as a voltage decreases, which is applied individually to the first electrode and the second electrode of the electro-responsive gel lens having the automatic multifocal and image stabilization functions according to the third embodiment of the present invention.

Here, as illustrated in FIG. 17, a focal point F1 may be formed such that a charge density of the transmissive part 3300 increases as electrons are charged to the transmissive part 3300 from the second electrode 3200 connected with a negative electrode of the external power supply, the partial surface of the transmissive part 3300 is deformed into a wave shape as the electrons are concentrated toward the plurality of first electrodes 3100 by an electrostatic repulsion force, and the partial surface 3320 performs the role of the convex lens as the partial surface 3320 protrudes in the vertical direction.

Furthermore, when the voltage applied to the first electrode 3100 and the second electrode 3200 increases, the partial surface 3320 of the transmissive part 3300 may be deformed into a wave shape and protrude further in the vertical direction, so that the focal point F1 of light is moved to a focal point F2 that is shortened in the optical axis direction.

In other words, as the partial surface of the transmissive part 3300 protrudes in the vertical direction, the focal point of the light may be changed in the vertical direction.

Also, a voltage may be individually applied to the plurality of first electrodes 3100 and the plurality of second electrodes 3200, and thus the partial surface 3320 may have the target shape having an inclination in a horizontal direction based of the optical axis direction of incident light.

Hereinafter, focal point change in the X-axis or the Y-axis will be described in detail with reference to FIGS. 19 and 20. The partial surface 3320 having an asymmetric shape may be formed by applying a different voltage to at least one of the unit electrodes 3120*a*, 3120*b*, 3120*c*, and 3120*d*.

Figure 19:
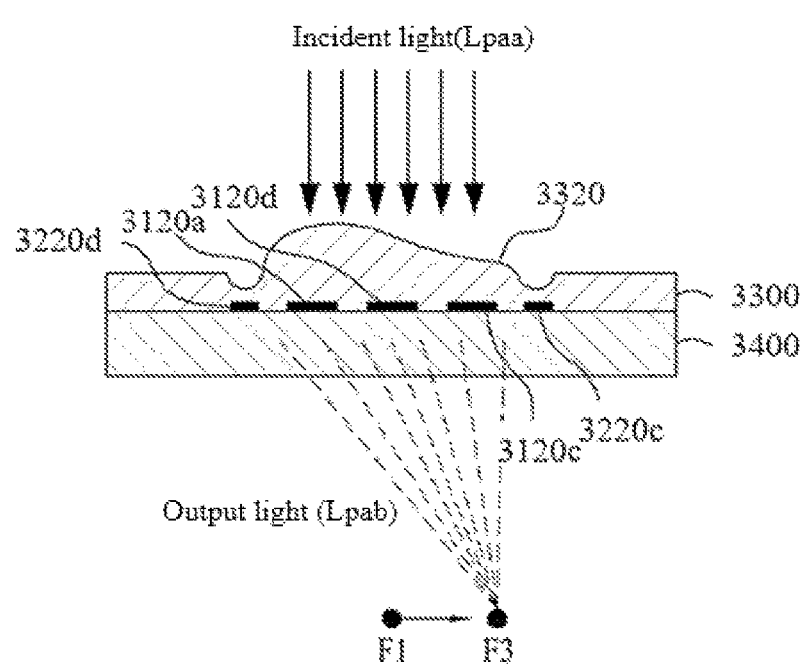
FIG. 19 is a cross-sectional view taken along line A-A' of FIG. 13 and illustrating a state in which a focal point is concentrated to one side of a vertical direction based on the optical axis direction as a voltage is individually applied to the first electrode and the second electrode of the electro-responsive gel lens having the automatic multifocal and image stabilization functions according to the third embodiment of the present invention.
Figure 20:
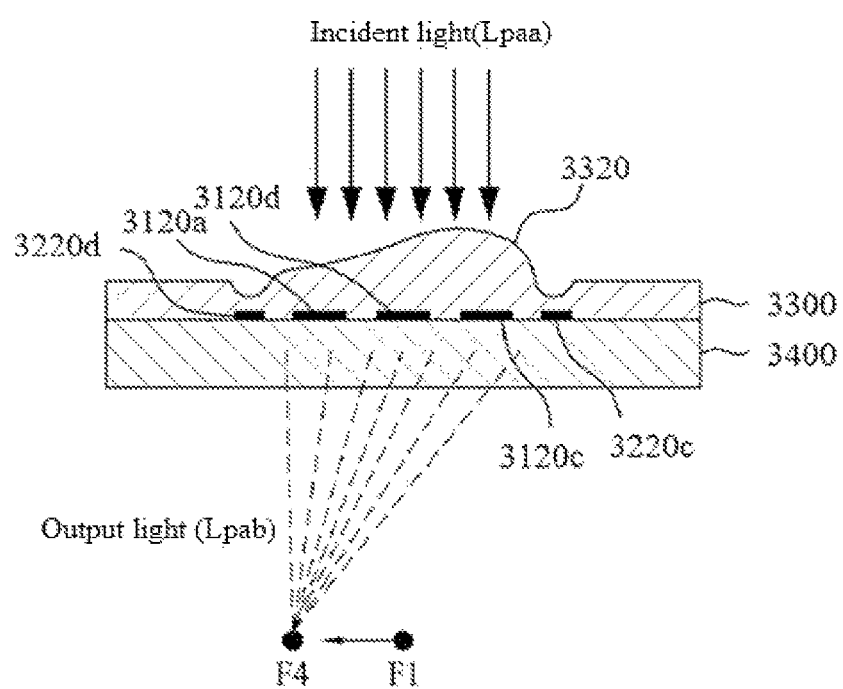
FIG. 20 is a cross-sectional view taken along line A-A' of FIG. 13 and illustrating a state in which a focal point is concentrated to the other side of the vertical direction based on the optical axis direction as a voltage is individually applied to the first electrode and the second electrode of the electro-responsive gel lens having the automatic multifocal and image stabilization functions according to the third embodiment of the present invention.

Here, when a vertical axis of the optical axis is assumed as the X-axis, the partial surface 3320 may have an inclination in the X-axis direction, and as the output light Lpab is concentrated to one side due to the inclination of the partial surface 3320, the incident light Lpaa may form a focal point that is changed from F1 to F3 as in FIG. 19 or from F1 to F4 as in FIG. 20.

In other words, as the partial surface 3320 having the asymmetric shape having the inclination is formed, the focal point change in the X-axis or the Y-axis may be performed.

Thus, as the focal point of the light passing through the transmissive part 300 is changed in three dimensions, the automatic focal point distance adjustment in the optical axis direction may be performed, and the optical image stabilization may be performed.

The transmissive part of the electro-responsive gel lens having the automatic the multifocal and image stabilization functions described through the first to third embodiments may include a light collecting member that will be described later to perform the role of the partial surface 320, 1320, 1340, and 3320.

Hereinafter, a case when a light collecting member disposed in a transmissive part 4300, 5300, and 7300 changes a focal point of light passing through the transmissive part 4300, 5300, and 7300 in three dimensions will be described in detail.

Here, since a first electrode, a second electrode, a substrate, and a distortion prevention part in fourth to sixth embodiments that will be described later have a function and a shape, which are similar to or as same as those in the first to third embodiments, descriptions thereof will be omitted, and only other features will be described.

Figure 21:
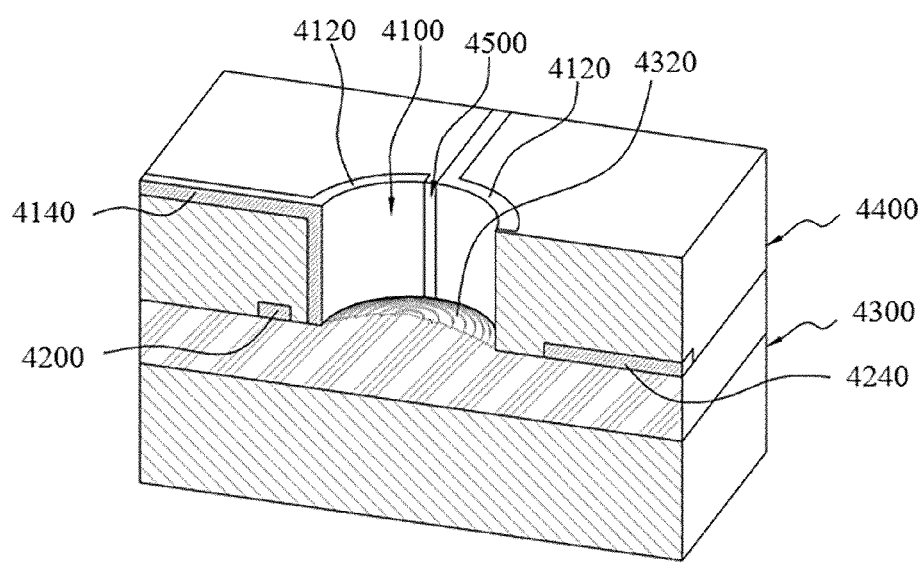
FIG. 21 is a schematic cross-sectional view illustrating an overall configuration of an electro-responsive gel lens having automatic multifocal and image stabilization functions according to a fourth embodiment of the present invention.

Firstly, an electro-responsive gel lens 40 having automatic the multifocal and image stabilization functions according to the fourth embodiment of the present invention may include a first electrode 4100, a second electrode 4200, and a transmissive part 4300 and further include a distortion prevention part 4500 like the first embodiment as illustrated in FIG. 21.

Here, the transmissive part 4300 may include a light collecting member 4320 and change a focal point of light passing through the transmissive part 4300 by using the light collecting member 4320 in three dimensions.

Specifically, the light collecting member 4320 may have a cross-section of a concave-convex shape having an inclined surface 4324.

Here, the light collecting member 4320 may diffract light incident through the inclined surface 4324 to form a focal point, and an inclination angle of the inclined surface 4324 may be changed when a voltage is applied to the first electrode 4100 and the second electrode 4200 to change the focal point of the light.

Also, the light collecting member 4320 may be formed such that a concave-convex portion has a constant height, and the inclined surface 4324 through which light is incident has a spherical surface shape or such that a distance between concave-convex portions is constant, and the inclined surface 4324 through which light is incident has a flat surface shape.

Specifically, the light collecting member 4320 may include a unit lens 4322 having a ring shape in which the concave-convex portions each having a cross-section having the inclined surface 4324 are arranged consecutively in a circumference direction thereof Here, a plurality of unit lenses 4322 may have the same central axis on the same plane and be arranged consecutively in a radial direction from the central axis.

That is, the light collecting member 4320 may be a circular pattern in which the plurality of unit lenses 4322 are arranged.

For example, the unit lens 4322 having the ring shape in which the concave-convex portion has a width of 0.2 mm, and a diameter from the central axis to the outer circumferential surface is 1 mm may be arranged on one plane, and the unit lens 4322 in which the concave-convex portion has a width of 0.2 mm, and a diameter from the central axis to the outer circumferential surface is 1.4 mm may be arranged to contact the outer circumferential surface of the arranged unit lens 4322 having the diameter of 1 mm.

Here, the arranged two unit lenses 4322 may have the same central axis. Likewise, the unit lens 4322 in which the concave-convex portion has a width of 0.2 mm, and a diameter from the central axis to the outer circumferential surface is 1.8 mm may be arranged subsequently, and repeatedly and consecutively arranged in the radial direction from the central axis.

Overall, the light collecting member 4320 may be formed on the same plane as the transmissive part 4300 and provided as the circular pattern consecutively arranged in the radial direction with the same central axis.

Here, the unit lens 4322 having the ring shape may have a cross-section having a symmetric triangular shape in which inclined surfaces 4324 face each other based on the central axis.

As described above, as the inclination angle of the inclined surface 4324 is changeable, and the shape of the light collecting member 4320 is deformed in three dimensions when a voltage is applied to the first electrode 4100 and the second electrode 4200, the location of the focal point of the light passing through the transmissive part 4300 may be changed in three dimensions The deformation of the light collecting member 4320 will be described in more detail with reference to FIGS. 22 and 23.

Figure 22:
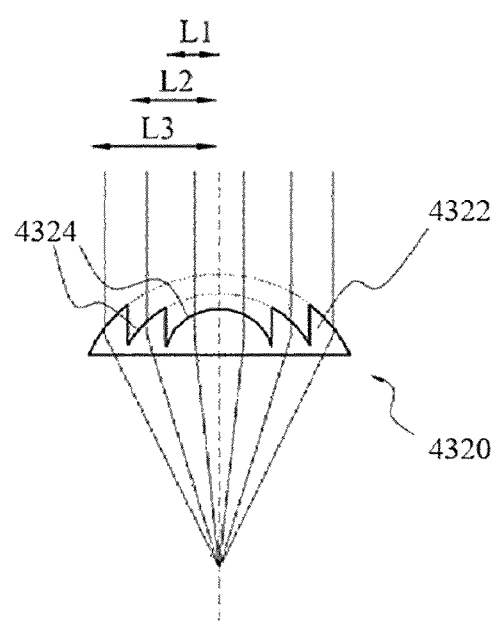
FIG. 22 is a schematic view illustrating a state before a voltage is applied of a focal point and a shape of a light collecting member of a transmissive part of the electro-responsive gel lens having the automatic multifocal and image stabilization functions according to the fourth embodiment of the present invention.
Figure 23:
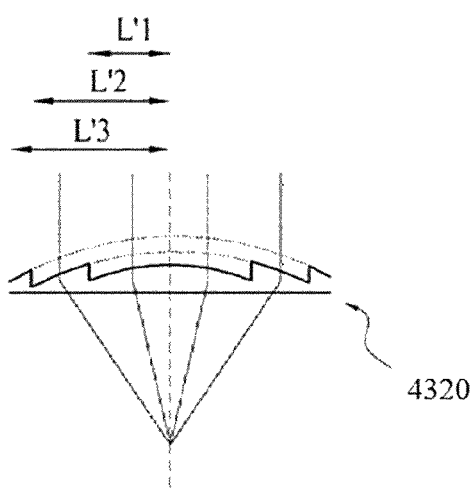
FIG. 23 is a schematic view illustrating a state in which a focal point is changed as the light collecting member is deformed when a voltage is applied of the electro-responsive gel lens having the automatic multifocal and image stabilization functions according to the fourth embodiment of the present invention.

Firstly, the light collecting member 4320 having a shape in FIG. 22 may be stretched into a shape in FIG. 23 in left and right directions when a voltage is applied to the first electrode 4100 and the second electrode 4200.

Specifically, the focal point of the light passing through the transmissive part 300 may be changed in three dimensions as the inclination angle is changed such that while the light collecting member 4320 is stretched in the left and right directions, based on a central portion of the light collecting member 4320, a radius of the unit lens 4322 having the inclined surface 4324 formed with a first inclination angle is changed from L1 to L'1, a radius of the unit lens 4322 having the inclined surface 4324 formed with a second inclination angle is changed from L2 to L'2, and a radius of the unit lens 4322 formed with a third inclination angle is changed from L3 to L'3.

Specifically, when the plurality of unit lenses 4322 have the same central axis on the same plane and are arranged consecutively in the radial direction from the central axis, a length from the central axis to the inclined surface 4324 may have a preset ratio.

For example, when it is assumed that a radius L1 of the unit lens 4322 that is concentric with the central axis of the light collecting member 4320 is 1 m, and a radius L2 of another unit lens 4322 contacting an outer circumferential surface of the unit lens 4322 having the radius of L1 is 2 m, a ratio of the radius L2 to the radius L1, i.e., a preset ratio, is 2, and a ratio of the radius L3 to the radius L2 is 2. Thus, the radius L3 of the unit lens 4322 disposed at an outermost portion may be set to be 4 mm.

Figure 24:
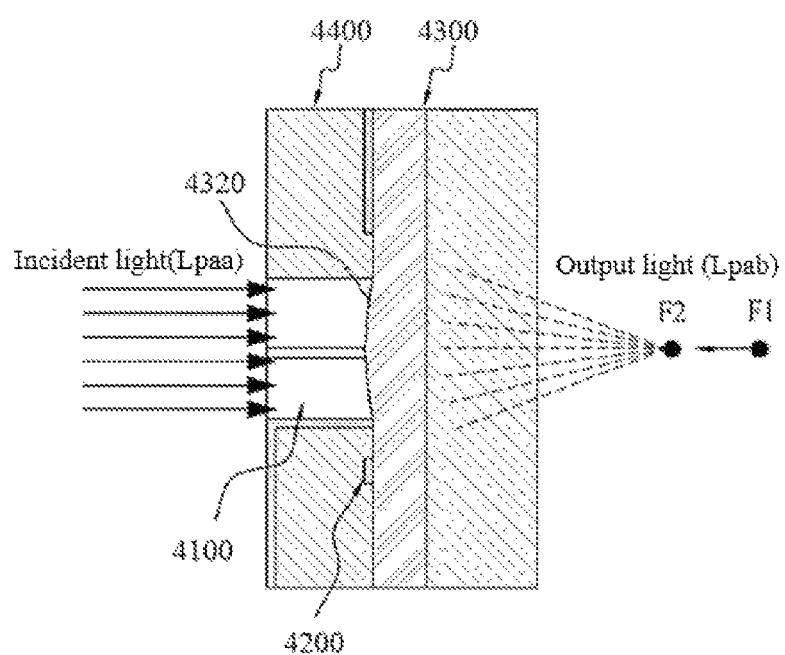
FIG. 24 is a cross-sectional view taken along line A-A' of FIG. 21 and illustrating a state in which a focal point decreases in an optical axis direction as a uniform voltage is applied to a plurality of unit electrodes of the electro-responsive gel lens having the automatic multifocal and image stabilization functions according to the fourth embodiment of the present invention.

Hereinafter, three-dimensional shape deformation and focal point movement of the light collecting member 4320 will be described in detail with reference to FIG. 24.

For example, when a voltage of 10 V is applied to all of the plurality of unit electrodes 4120 of the first electrode, the light collecting member 4320 may be deformed to have an overall increased radius of curvature as in FIG. 23, and accordingly an angle of the inclined surface 4324 may be changed, so that a distance to the focal point F2 becomes less than a distance to the focal point F1 of the output light Lpab. Thus, the focal point may be changed in the optical axis (e.g., the Z-axis).

On the other hand, when a voltage of 5 V is applied to at least one of the unit electrodes 4120, and a voltage of 10 V is applied to the rest, the light collecting member 4320 having an asymmetric shape having an inclination based on the vertical axis (e.g., the X-axis or the Y-axis) of the optical axis (e.g., the Z-axis) may be formed.

Hereinafter, focal point change in the X-axis or the Y-axis will be described in detail with reference to FIGS. 25 and 26.

Figure 25:
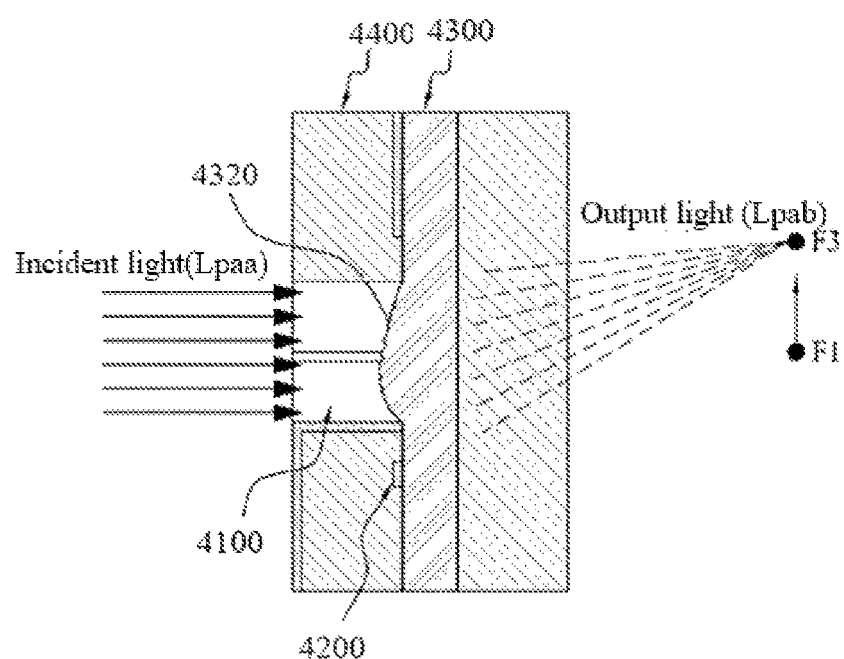
FIG. 25 is a cross-sectional view taken along line A-A' of FIG. 21 and illustrating a state in which the focal point is concentrated to one side of a vertical direction based on the optical axis direction as a voltage is individually applied to the plurality of unit electrodes of the electro-responsive gel lens having the automatic multifocal and image stabilization functions according to the fourth embodiment of the present invention.
Figure 26:
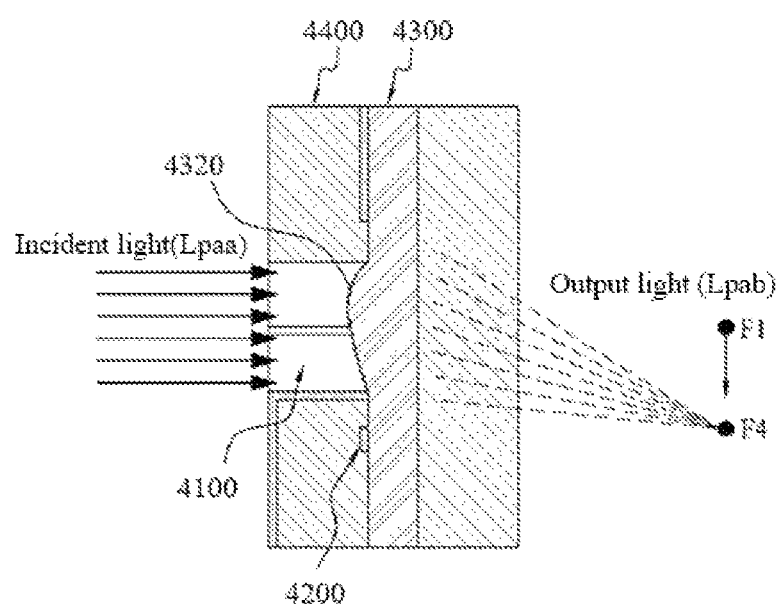
FIG. 26 is a cross-sectional view taken along line A-A' of FIG. 21 and illustrating a state in which the focal point is concentrated to the other side of the vertical direction based on the optical axis direction as a voltage is individually applied to the plurality of unit electrodes of the electro-responsive gel lens having the automatic multifocal and image stabilization functions according to the fourth embodiment of the present invention.

When the vertical axis of the optical axis is assumed as the X-axis, the light collecting member 4320 may have an inclination in the X-axis direction, and as the output light Lpab is concentrated to one side due to the inclination of the light collecting member 4320, the incident light Lpaa may form a focal point that is changed from F1 to F3 as in FIG. 25 or from F1 to F4 as in FIG. 26.

Thus, as the light collecting member 4320 having the asymmetric shape having the inclination is formed, the focal point change in the X-axis or the Y-axis may be performed.

Here, the light collecting member 4320 may be directly formed on a body having a cuboid shape.

Also, the focal point may be smoothly changed by forming an auxiliary protruding surface having a preset radius of curvature on the body in a direction in which light is incident and then forming the light collecting member 4320 on the auxiliary protruding surface.

Accordingly, the light collecting member 4320 having the fresnel lens shape may reducing a total size of the transmissive part 4300 to enable miniaturization of an electronic device.

The above-described light collecting member 4320 may be applied to the transmissive part having the biconvex lens shape as in the second embodiment.

Figure 27:
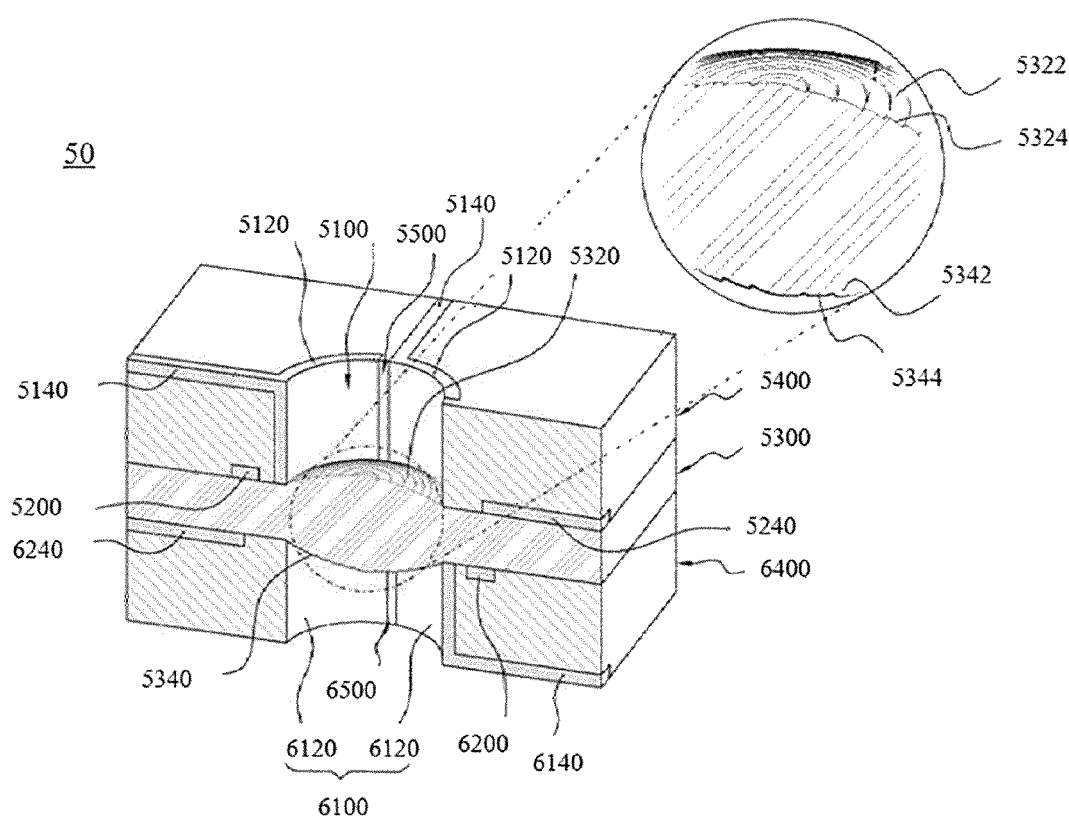
FIG. 27 is a schematic cross-sectional view illustrating an overall configuration of an electro-responsive gel lens having automatic multifocal and image stabilization functions according to a fifth embodiment of the present invention.

Referring to FIG. 27, an electro-responsive gel lens 50 having automatic multifocal and image stabilization functions according to a fifth embodiment of the present invention may include a first upper electrode 5100, a second upper electrode 5200, an upper substrate 5400, a transmissive part 5300, a first lower electrode 6100, a second lower electrode 6200, and a lower substrate 6400 like the second embodiment and further include an upper distortion prevention part 5500 and a lower distortion prevention part 6500 like the second embodiment.

Here, since the first upper electrode 5100, the second upper electrode 5200, the upper substrate 5400, the transmissive part 5300, the first lower electrode 6100, the second lower electrode 6200, the lower substrate 6400, the upper distortion prevention part 5500 and the lower distortion prevention part 6500 have a shape and a function similar to or as same as those in the second embodiment, descriptions thereof will be omitted, and only different features will be described.

A first light collecting member 5320 may be formed on the transmissive part 5300 to perform the role of the first partial surface 1320 that is described above in the second embodiment, and a second light collecting member 5340 may be formed below the transmissive part 5300 to perform the role of the second partial surface 1340 that is described above in the second embodiment.

Figure 28:
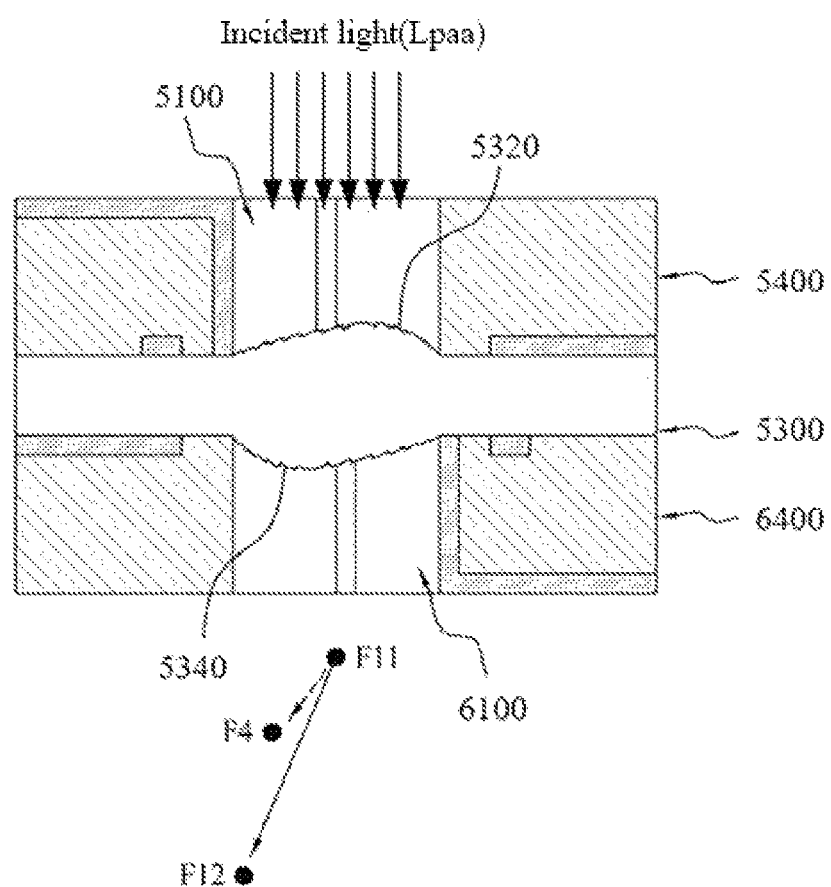
FIG. 28 is a cross-sectional view taken along line B-B' and illustrating a state in which a first light collecting member and a second light collecting member are asymmetric in a vertical direction when a voltage is individually applied to a plurality of unit electrodes of the electro-responsive gel lens having the automatic multifocal and image stabilization functions according to the fifth embodiment of the present invention.

Here, since a shape and a deformation principle of the first light collecting member 5320 and the second light collecting member 5340 are the same as those in the second embodiment and the fourth embodiment, descriptions thereof will be omitted, and a case when each of the first light collecting member 5320 and the second light collecting member 5340 has an asymmetric shape will be described below with reference to FIG. 28.

Specifically, when a voltage of 5 V is applied to at least one of the upper unit electrodes 5120, and a voltage of 10 V is applied to the rest, the first light collecting member 5320 having an asymmetric shape having an inclination based on the vertical axis (e.g., the X-axis or the Y-axis) of the optical axis (e.g., the Z-axis) may be formed, and when a voltage of 5 V is applied to at least one of lower unit electrodes 6120, and a voltage of 10 V is applied to the rest, the second light collecting member 5340 having an asymmetric shape having an inclination based on the vertical axis (e.g., the X-axis or the Y-axis) of the optical axis (e.g., the Z-axis) may be formed.

Specifically, the first light collecting member 5320 and the second light collecting member 5340, which have the asymmetric shape having an inclination, are respectively disposed on both surfaces of the transmissive part 5300, and all of the first light collecting member 5320 and the second light collecting member 5340 are deformable, a focal point F11 of light passing through the transmissive part 1300 may be moved to a focal point F12.

Here, the changed focal point F12 may be further changed in the optical axis (the Z-axis) and the vertical axis (the X-axis or the Y-axis) of the optical axis in comparison with the focal point F4 changed as only one light collecting member is provided on a cross-section of the transmissive part in the fourth embodiment.

That is, as a range of changing the focal point of the light passing through the transmissive part 5300 in three dimensions is expanded based on the fourth embodiment, a focal point distance may be automatically adjusted in the optical axis direction and changed in the vertical direction of the optical axis direction to perform the optical image stabilization without securing an extra space, and a total size of the transmissive part 5300 may be reduced to enable miniaturization of an electronic device like the fourth embodiment.

The light collecting member described through the fourth embodiment and the fifth embodiment may be applied to the thin-film type transmissive part in the third embodiment.

Figure 29:
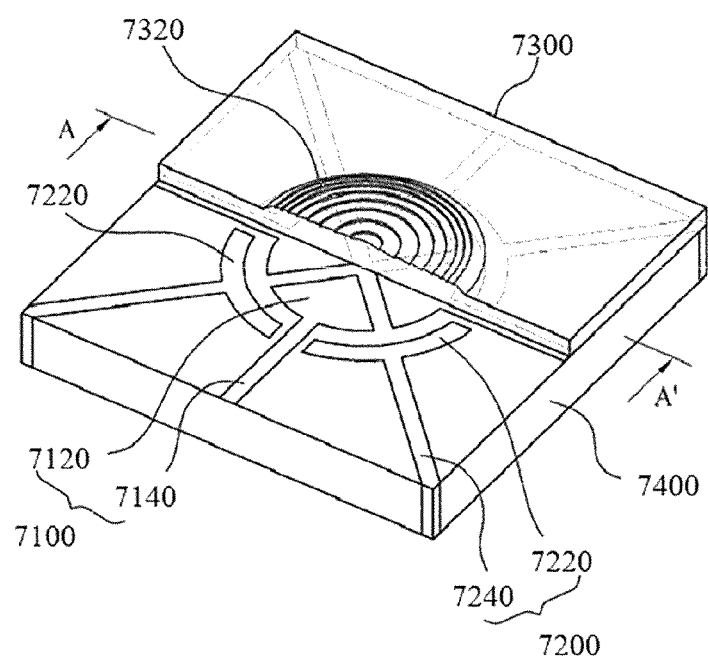
FIG. 29 is a schematic cross-sectional view illustrating an overall configuration of an electro-responsive gel lens having automatic multifocal and image stabilization functions according to a sixth embodiment of the present invention.

Hereinafter, an electro-responsive gel lens 60 having automatic multifocal and image stabilization functions according to a sixth embodiment of the present invention will be described in detail with reference to FIG. 29.

The electro-responsive gel lens 60 having the automatic multifocal and image stabilization functions according to the sixth embodiment of the present invention may include a first electrode 7100 and a second electrode 7200, which are formed on a substrate 7400, and a transmissive part 7300 and further include a distortion prevention part like the third embodiment.

Here, since the first electrode 7100, the second electrode 7200, the substrate 7400, and the distortion prevention part are similar to or as same as those in the third embodiment, descriptions thereof will be omitted, and only different features will be described.

The transmissive part 7300 according to the sixth embodiment of the present invention may include a light collecting member 7320 like the fourth embodiment and the fifth embodiment, and the light collecting member 7320 may perform the role of the partial surface 3340 in the third embodiment.

Thus, the transmissive part 7300 may change a focal point of light passing through the transmissive part 7300 in three dimensions when a voltage is applied to the first electrode 7100 and the second electrode 7200.

Specifically, as the light collecting member 7320 is stretched in the vertical direction of the optical axis when a voltage is applied to the first electrode 7100 and the second electrode 7200, an inclination angle of an inclined surface formed on a unit lens may be changed.

Thus, a location of a focal point of light passing through the inclined surface may be changed.

Here, since a shape of the light collecting member 7320 is similar to or as same as that of the light collecting member described in the fourth embodiment and the fifth embodiment, descriptions thereof will be omitted, and a three-dimensional change of a location of a focal point of light passing through the transmissive part 7300 including the light collecting member 7320 will be described in detail below.

Since the light collecting member 7320 has the inclined surface described in the fourth embodiment and the fifth embodiment instead of the partial surface described in the third embodiment, a focal point F1 may be formed as the incident light Lpaa is concentrated to one side even when a voltage is not applied to the first electrode 7100 and the second electrode 7200.

As electrons may be charged to the transmissive part 7300 from the second electrode 7200 connected with a negative electrode of an external power supply when a voltage is not applied to the first electrode 7100 and the second electrode 7200, a charge density of the transmissive part 7300 may increase, and as the electrons are concentrated toward a plurality of first electrodes 7100 by an electrostatic repulsion force, the light collecting member 7320 may protrude in a direction opposite to a traveling direction of light incident to the transmissive part 7300.

Figure 30:
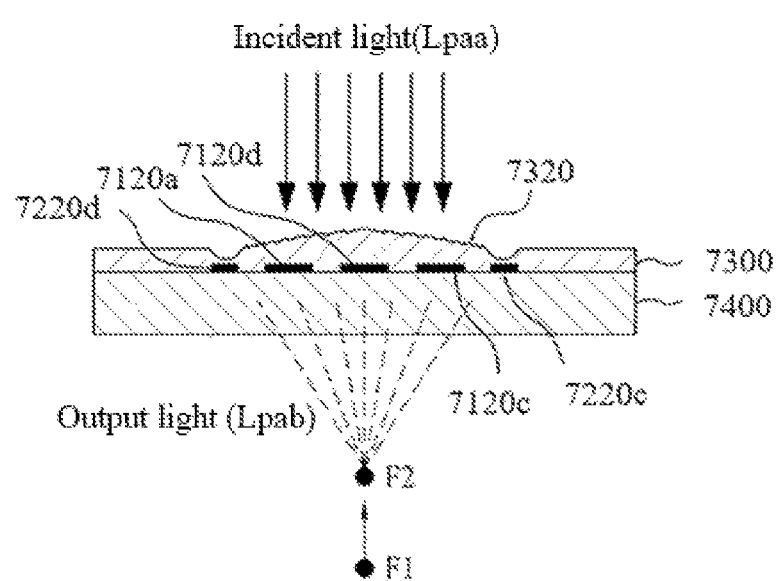
FIG. 30 is a cross-sectional view taken along line A-A' of FIG. 29 and illustrating a state in which a focal point distance of light decreases in an optical axis direction when a voltage is applied to a first electrode and a second electrode of the electro-responsive gel lens having the automatic multifocal and image stabilization functions according to the sixth embodiment of the present invention.

Due to the protrusion of the light collecting member 7320, the light collecting member 7320 may be deformed into a shape stretched in the vertical direction as illustrated in FIG. 30, and a focal point F1 formed when a voltage is not applied may be changed in location to a focal point F2. Thus, the focal point may be changed in the optical axis direction (e.g., the Z-axis) according to a voltage applied to the first electrode 7100 and the second electrode 7200.

Figure 31:
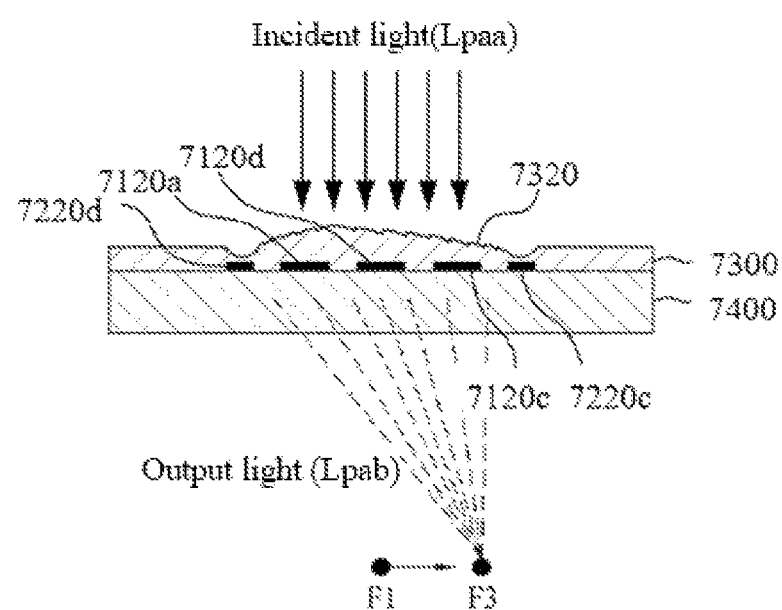
FIG. 31 is a cross-sectional view taken along line A-A' of FIG. 29 and illustrating a state in which a focal point is concentrated to one side of a vertical direction based on the optical axis direction as a voltage is individually applied to the first electrode and the second electrode of the electro-responsive gel lens having the automatic multifocal and image stabilization functions according to the sixth embodiment of the present invention.
Figure 32:
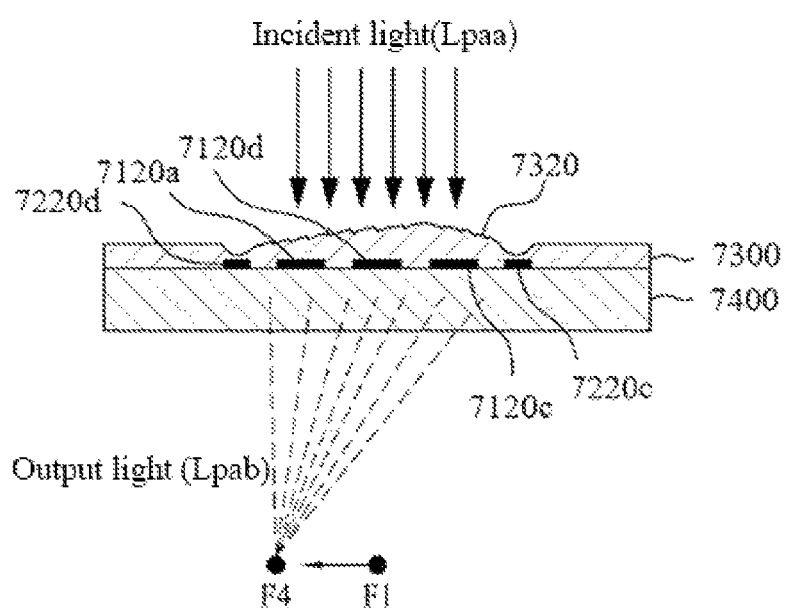
FIG. 32 is a cross-sectional view taken along line A-A' of FIG. 29 and illustrating a state in which the focal point is concentrated to the other side of a vertical direction based on the optical axis direction as a voltage is individually applied to the first electrode and the second electrode of the electro-responsive gel lens having the automatic multifocal and image stabilization functions according to the sixth embodiment of the present invention.

Also, the light collecting member 7320 having an asymmetric shape may be formed by applying a different voltage to at least one of a plurality of unit electrodes as illustrated in FIGS. 31 and 32. When the vertical axis of the optical axis is assumed as the X-axis, the light collecting member 7320 may have an inclination in the X-axis direction, and as the output light Lpab is concentrated to one side due to the inclination of the light collecting member 7320, the incident light Lpaa may form a focal point that is changed from F1 to F3 as in FIG. 31 or from F1 to F4 as in FIG. 32.

In other words, as the light collecting member 7320 having the asymmetric shape having the inclination is formed, the transmissive part 7300 may change the focal point in the X-axis or the Y-axis.

Here, the light collecting member 7320 may be directly formed on the body having the cuboid shape described in the third embodiment. Alternatively, an auxiliary protruding surface having a preset radius of curvature may be formed on the body in a direction in which light is incident, and then the light collecting member 7320 may be formed on the auxiliary protruding surface.

As described above, the electro-responsive gel lens having the automatic multifocal and image stabilization functions may perform the optical image stabilization in addition to the auto focus in the optical axis direction as the location of the focal point of the light passing through the transmissive part is changed in three dimensions.

Also, as the transmissive part has a fresnel gel lens configuration by including the light collecting member, an electronic device including the electro-responsive gel lens having the automatic multifocal and image stabilization functions may be miniaturized.

Although the embodiments of the present invention have been described, it is understood that the present invention should not be limited to these embodiments but various changes and modifications can be made by one ordinary skilled in the art within the spirit and scope of the present invention as hereinafter claimed.

The invention claimed is:

1. An electro-responsive gel lens having automatic multifocal and image stabilization functions, comprising:
   a first electrode and a second electrode, which are formed on a substrate and have different polarities; and
   a transmissive part formed of an electro-active polymer and having a shape deformed when a voltage is applied to the first electrode and the second electrode,
   wherein as at least one of the first electrode and the second electrode is provided in plurality, and a voltage is individually applied to change the shape of the transmissive part in three dimensions, a location of a focal point of light passing through the transmissive part is changed in three dimensions,
   wherein one of the first electrode and the second electrode, which is provided in plurality, comprises a plurality of unit electrodes to which a voltage is individually applied on the substrate, and
   the electro-responsive gel lens further comprises a distortion prevention part configured to block electrical interference between the plurality of unit electrodes and prevent shape distortion of the transmissive part.

2. The electro-responsive gel lens of claim 1, wherein the distortion prevention part is formed on the substrate so that the plurality of unit electrodes are spaced a preset distance from each other.

3. The electro-responsive gel lens of claim 2, wherein the preset distance is in a range from 50 μm to 1000 μm.

4. The electro-responsive gel lens of claim 2, wherein the transmissive part is disposed to expose a partial surface through a through-hole defined in the substrate, and
   one of the first electrode and the second electrode is provided in plurality and arranged on the substrate along an inner circumferential surface of the through-hole, and the other of the first electrode and the second electrode, which is not provided in plurality, is spaced a preset distance from the inner circumferential surface of the through-hole and disposed below the substrate in the form of surrounding the through-hole.

5. The electro-responsive gel lens of claim 4, wherein the present distance that is a distance between the first electrode and the second electrode is set in correspondence to a voltage in a preset range, which is applied from the first electrode and the second electrode to the transmissive part.

6. The electro-responsive gel lens of claim 4, wherein the distortion prevention part is formed between the plurality of unit electrodes so that the plurality of unit electrodes are spaced a preset distance from each other.

7. The electro-responsive gel lens of claim 6, wherein the preset distance that is a distance between the plurality of unit electrodes is changed according to a diameter of the through-hole.

8. The electro-responsive gel lens of claim 2, wherein the transmissive part is disposed on the substrate so that a partial surface protrudes when a voltage is applied, and
   all of the first electrode and the second electrode comprise a plurality of unit electrodes between the substrate and the transmissive part,
   wherein the first electrode corresponds to a partial surface of the transmissive part, and
   the second electrode is formed on the same plane as the first electrode and spaced a preset distance from a circumference of the first electrode to surround a portion of the circumference of the first electrode.

9. The electro-responsive gel lens of claim 8, wherein the preset distance that is a distance between the first electrode and the second electrode prevents short circuit between the first electrode and the second electrode.

10. The electro-responsive gel lens of claim 9, wherein the present distance that is the distance between the first electrode and the second electrode is set in correspondence to a voltage in a preset range, which is applied from the first electrode and the second electrode to the transmissive part.

11. The electro-responsive gel lens of claim 8, wherein the distortion prevention part is formed between the plurality of unit electrodes so that the plurality of unit electrodes are spaced a preset distance from each other.

12. The electro-responsive gel lens of claim 11, wherein the preset distance that is a distance between the plurality of unit electrodes is changed according to a diameter of the protruding partial surface.

13. The electro-responsive gel lens of claim 1, wherein the light collecting member comprises a unit lens having a ring shape in which concave-convex portions each having a cross-section having an inclined surface are arranged consecutively in a circumferential direction thereof.

14. The electro-responsive gel lens of claim 13, wherein a plurality of unit lenses have the same central axis on the same plane and arranged consecutively in a radial direction from the central axis.

15. The electro-responsive gel lens of claim 14, wherein a length of the unit lens from the central axis to the inclined surface has a preset ratio.

16. An electro-responsive gel lens having automatic multifocal and image stabilization functions, comprising:
a first electrode and a second electrode, which are formed on a substrate and have different polarities; and
a transmissive part formed of an electro-active polymer and having a shape deformed when a voltage is applied to the first electrode and the second electrode,
wherein as at least one of the first electrode and the second electrode is provided in plurality, and a voltage is individually applied to change the shape of the transmissive part in three dimensions, a location of a focal point of light passing through the transmissive part is changed in three dimensions,
wherein the transmissive part comprises a light collecting member having a concave-convex shape of which a cross-section has an inclined surface to diffract incident light through the inclined surface, and an inclination angle of the inclined surface is changed when a voltage is applied to the first electrode and the second electrode.

* * * * *